US011954700B2

(12) United States Patent
Thimsen et al.

(10) Patent No.: US 11,954,700 B2
(45) Date of Patent: *Apr. 9, 2024

(54) DIGITAL SURVEY CREATION BY PROVIDING OPTIMIZED SUGGESTED CONTENT

(71) Applicant: Qualtrics, LLC, Provo, UT (US)

(72) Inventors: John Thimsen, Seattle, WA (US); Jeffrey Wade Starr, Orem, UT (US)

(73) Assignee: Qualtrics, LLC, Provo, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/819,854

(22) Filed: Aug. 15, 2022

(65) Prior Publication Data

US 2022/0391931 A1 Dec. 8, 2022

Related U.S. Application Data

(63) Continuation of application No. 16/256,778, filed on Jan. 24, 2019, now Pat. No. 11,423,425.

(51) Int. Cl.
*G06Q 10/00* (2023.01)
*G06F 16/901* (2019.01)
*G06Q 30/0203* (2023.01)

(52) U.S. Cl.
CPC ..... *G06Q 30/0203* (2013.01); *G06F 16/9024* (2019.01)

(58) Field of Classification Search
None
See application file for complete search history.

(56) References Cited

U.S. PATENT DOCUMENTS

| 7,475,339 B2* | 1/2009 | Holloway | G06Q 10/10 715/237 |
| 8,429,179 B1* | 4/2013 | Mirhaji | G06N 5/02 707/756 |
| 8,433,715 B1* | 4/2013 | Mirhaji | G06F 16/9024 707/756 |
| 8,676,937 B2* | 3/2014 | Rapaport | H04L 12/1818 709/219 |

(Continued)

OTHER PUBLICATIONS

Minas, Mark. "Creating semantic representations of diagrams." International Workshop on Applications of Graph Transformations with Industrial Relevance. Springer, Berlin, Heidelberg, 1999. (Year: 1999) (Year: 1999).*

(Continued)

*Primary Examiner* — Gurkanwaljit Singh
(74) *Attorney, Agent, or Firm* — Keller Preece PLLC

(57) ABSTRACT

The present disclosure relates to a question recommendation system that intelligently optimizes a survey being created by a user by providing customized suggestions. For example, in one or more embodiments, the question recommendation system provides a suggested question based on questions previous added by a user while creating a survey. In particular, the question recommendation system provides various recommendations to the user to further optimize a survey being created. For instance, the question recommendation system provides recommendations with respect to improving question ordering, question phrasing, and question type as well as recommends removing potentially inefficient questions.

20 Claims, 18 Drawing Sheets

(56) References Cited

U.S. PATENT DOCUMENTS

| | | | | |
|---|---|---|---|---|
| 2003/0033193 | A1* | 2/2003 | Holloway | G06Q 10/10 715/237 |
| 2004/0049416 | A1* | 3/2004 | Alison, III | G06Q 30/0203 705/7.32 |
| 2010/0004975 | A1* | 1/2010 | White | G06Q 30/0201 705/7.29 |
| 2012/0158633 | A1* | 6/2012 | Eder | G16H 50/20 707/E17.014 |
| 2012/0290950 | A1* | 11/2012 | Rapaport | G06Q 10/10 715/753 |
| 2013/0111323 | A1* | 5/2013 | Taghaddos | G06F 40/174 715/223 |
| 2013/0185657 | A1* | 7/2013 | Gunawardena | G06F 16/48 715/753 |
| 2013/0246049 | A1* | 9/2013 | Mirhaji | G06F 40/289 704/9 |
| 2013/0275448 | A1* | 10/2013 | Mirhaji | G06F 16/2465 707/756 |
| 2014/0059089 | A1* | 2/2014 | Bryden | G06F 16/35 707/803 |
| 2015/0026260 | A1* | 1/2015 | Worthley | G06F 16/958 709/204 |
| 2017/0046329 | A1* | 2/2017 | Mirhaji | G06F 40/211 |
| 2017/0123643 | A1* | 5/2017 | Berns | H04L 67/104 |
| 2017/0124174 | A1* | 5/2017 | Starr | G06F 16/93 |
| 2018/0300794 | A1* | 10/2018 | Viederman | G06K 9/623 |
| 2019/0065017 | A1* | 2/2019 | Keller | G06T 11/206 |
| 2020/0042530 | A1* | 2/2020 | Ross | G06Q 50/18 |

OTHER PUBLICATIONS

Leskovec, Jure, Marko Grobelnik, and Natasa Milic-Frayling. "Learning sub-structures of document semantic graphs for document summarization." LinkKDD Workshop. vol. 133. 2004. (Year: 2004) (Year: 2004).*

Shen, Dan, and Mirella Lapata. "Using semantic roles to improve question answering." Proceedings of the 2007 joint conference on empirical methods in natural language processing and computational natural language learning (EMNLP-CONLL). 2007. (Year: 2007) (Year: 2007).*

Yih, Scott Wen-tau, et al. "Semantic parsing via staged query graph generation: Question answering with knowledge base." (2015). (Year: 2015) (Year: 2015).*

A. Singh, A. Taneja and G. Mangalaraj, "Creating online surveys: some wisdom from the trenches tutorial," in IEEE Transactions on Professional Communication, vol. 52, No. 2, pp. 197-212, Jun. 2009, doi: 10.1109/TPC.2009.2017986 (Year: 2009) (Year: 2009).*

A. Singh, A. Taneja and G. Mangalaraj, "Creating online surveys: some wisdom from the trenches tutorial," in IEEE Transactions on Professional Communication, vol. 52, No. 2, pp. 197-212, Jun. 2009, doi: 10.1109/TPC.2009.2017986 (Year: 2009).

Minas, Mark. "Creating semantic representations of diagrams." International Workshop on Applications of Graph Transformations with Industrial Relevance. Springer, Berlin, Heidelberg, 1999. (Year: 1999) [Abstract only].

Leskovec, Jure, Marko Grobelnik, and Natasa Milic-Frayling. "Learning sub-structures of document semantic graphs for document summarization." LinkKDD Workshop. vol. 133. 2004. (Year: 2004).

Shen, Dan, and Mirella Lapata. "Using semantic roles to improve question answering." Proceedings of the 2007 joint conference on empirical methods in natural language processing and computational natural language learning (EMNLP-CONLL). 2007. (Year: 2007).

Yih, Scott Wen-tau, et al. "Semantic parsing via staged query graph generation: Question answering with knowledge base." (2015). (Year: 2015).

U.S. Appl. No. 16/256,778, filed Sep. 25, 2020, Office Action.
U.S. Appl. No. 16/256,778, filed May 17, 2021, Office Action.
U.S. Appl. No. 16/256,778, filed Nov. 24, 2021, Office Action.
U.S. Appl. No. 16/256,778, filed Apr. 12, 2022, Notice of Allowance.

* cited by examiner

Fig. 7A

New Survey — 912

▶ Default Survey Block    Block Options ⌄

☐ Q1: What is your name?
⚙

☐ Q2: What is your email?
⚙

[Fix] [Ignore] ⓘ
Suggestion: Consider Rephrasing the question as "What do you wish was different about Product X?" Rephrasing could improve response rates by 17%. — 916

☐ Q3: Describe your experience with Product X. — 914
⚙

(Add New Question)

*Fig. 9B*

DIGITAL SURVEY CREATION BY PROVIDING OPTIMIZED SUGGESTED CONTENT

CROSS-REFERENCE TO RELATED APPLICATIONS

The present application is a continuation of U.S. application Ser. No. 16/256,778, filed on Jan. 24, 2019. The aforementioned application is hereby incorporated by reference in its entirety.

BACKGROUND

Recent advancements in computing devices and networking technology have led to a variety of innovations in composing and creating digital surveys to gather information, ranging from curious to critical. For example, conventional survey creation systems can enable individuals to compile lists of questions into digital surveys and distribute the digital surveys to respondents. Indeed, many conventional survey creation systems provide tools, templates, libraries, interfaces, and other options to assist individuals to create digital surveys.

Despite these and other advances, however, conventional survey creation systems continue to suffer from a number of limitations in relation to efficiency, accuracy, and functionality. To illustrate, the tools provided by many conventional survey creation systems that assist individuals in creating digital surveys introduce numerous inefficiencies across computing devices. For example, while the survey building tools provided by conventional survey creation systems enable individuals to build various types of surveys, the survey building tools fail to optimize surveys with respect to question type, order, phrasing, etc.

As a result, respondents often fail to complete or meaningfully respond to questions in surveys. Indeed, computing resources are wasted by recipients starting, but not completing, surveys—both in terms of administering as well as processing survey questions. Further, in many instances, the survey system then sends the survey to other respondents to compensate for the previous respondents not completing the survey, but these other respondents may also fail to complete the survey for similar reasons. Overall, the accumulation of incomplete and inadequate responses wastes the computing resources of conventional survey creation systems as well as respondent client devices.

Additionally, many conventional survey creation systems lack the ability to identify and organize survey questions in a meaningful way. For example, conventional survey creation systems have been unable to efficiently analyze different survey questions provided by individuals creating surveys. Indeed, because survey questions can span a variety of topics and be worded in a variety of ways, conventional survey creation systems struggle to encode survey questions into uniform representations. Accordingly, conventional survey creation systems lack the ability to organize survey question data in a meaningful way.

These efficiency and accuracy problems described above are exacerbated by the rigidity of conventional survey creation systems. For instance, conventional survey creation systems do not provide individually tailored feedback to users creating surveys based on previously collected survey data or emergent survey question patterns. Accordingly, the conventional survey creation systems mentioned above are inflexible, in that they cannot adjust or provide customized survey creation tools suited to an individual's needs.

These along with additional problems and issues exist with regard to conventional survey creation systems.

SUMMARY

Embodiments of the present disclosure provide benefits and/or solve one or more of the foregoing or other problems in the art with systems, computer media, and methods for improving survey creation by providing customized suggestions to users during the creation of digital surveys that optimize the surveys being created. For example, in one or more embodiments, the disclosed systems suggest questions that a user should add to a survey that increase the likelihood of respondents providing meaningful answers to the questions. In some embodiments, the disclosed systems provide suggestions to reorder questions, add branching logic to a survey, and/or remove a question from a survey. Overall, the disclosed systems provide users with tools and suggestions to optimize a survey such that respondents will more fully respond to the survey.

To illustrate, in various embodiments the disclosed systems receive a survey prompt (e.g., question) from a client device of a user (e.g., a survey creator). Based on the received survey prompt, the disclosed systems generate a semantic label and identify one or more survey graphs in a survey graph database that includes the semantic label. For instance, the disclosed systems identify a node of a survey graph that matches the semantic label for the received survey prompt. The disclosed systems can traverse the identified survey graph to locate an additional survey question related to the received survey prompt. The disclosed systems can then provide the additional survey question to the user's client device as a suggested question.

The following description sets forth additional features and advantages of one or more embodiments of the disclosed systems, computer media, and methods. In some cases, such features and advantages will be obvious to a skilled artisan from the description or may be learned by the practice of the disclosed embodiments.

BRIEF DESCRIPTION OF THE DRAWINGS

The detailed description describes one or more embodiments with additional specificity and detail through the use of the accompanying drawings, as briefly described below.

FIGS. 7A-7B illustrate example of survey graphs and providing multiple suggested questions in accordance with one or more embodiments.

FIGS. 9A-9B illustrate example diagrams of recommending question phrasing for a question in accordance with one or more embodiments.

DETAILED DESCRIPTION

Figure 1:
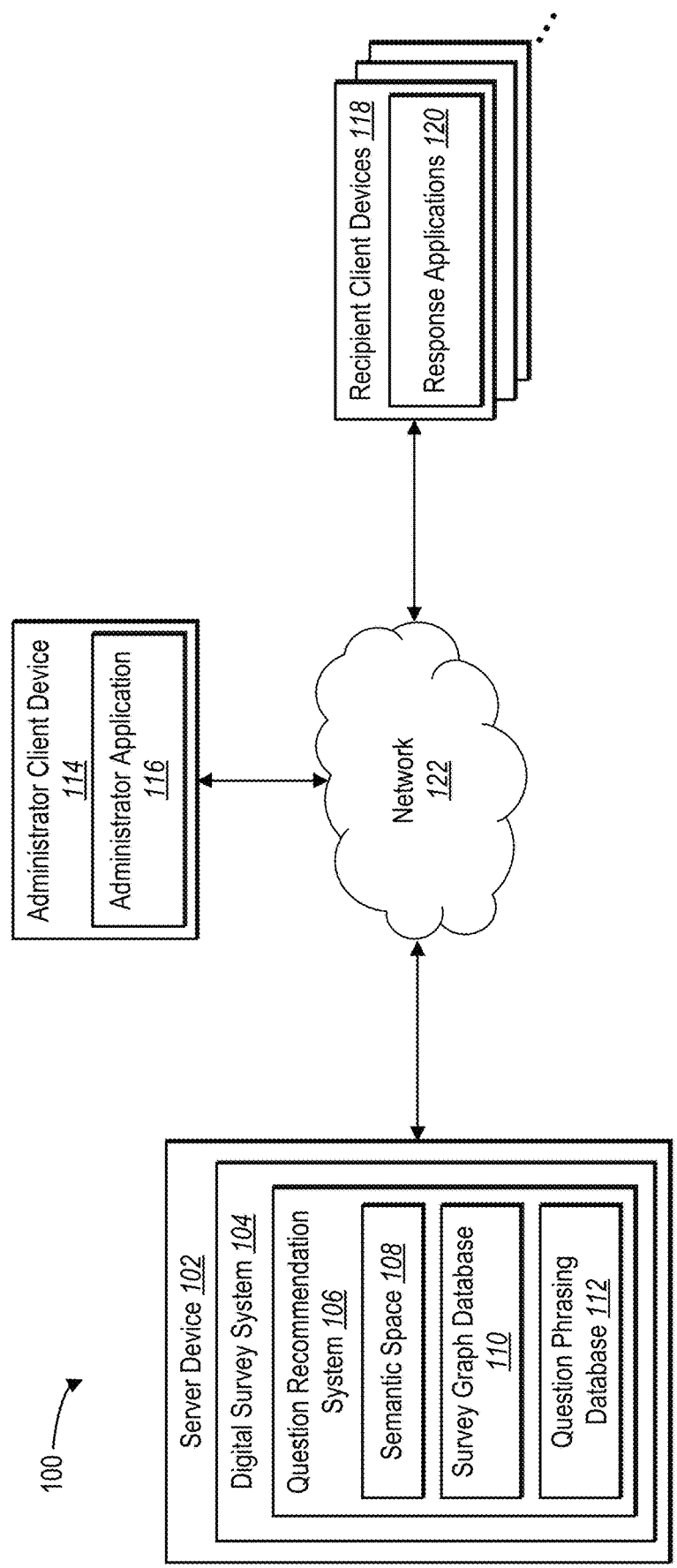
FIG. 1 illustrates a schematic diagram of an example environment in which the question recommendation system can operate in accordance with one or more embodiments.

This disclosure describes one or more embodiments of a question recommendation system that intelligently improves a survey by providing customized suggestions to a client device associated with a user creating the survey. For example, the question recommendation system provides a suggested question based on one or more previous questions added to the survey by a user. In addition, the question recommendation system provides various recommendations to further optimize a survey being created. For instance, the question recommendation system provides recommendations with respect to improving question ordering, question phrasing, and question type, as well as removing potentially inefficient questions.

To illustrate, in one or more embodiments, the question recommendation system receives a survey prompt (e.g., question) from a client device associated with a user. For example, the client device provides a survey question based on the user creating a survey. Upon receiving the survey prompt, the question recommendation system generates a semantic label for the prompt. In addition, the question recommendation system identifies a survey graph from a database of survey graphs that has a node labeled with the semantic label identified for the received survey prompt. Further, the question recommendation system traverses the nodes of the identified survey graph to identify an additional node. Based, on the additional node, the question recommendation system provides a suggested survey prompt to the client device, which the client device offers to the user to add to the survey being created.

As mentioned above, the question recommendation system generates a semantic label for the received survey prompt. In general, a semantic label refers to an identifier coded based on the context of the survey prompt. In this manner, survey prompts or questions that use different phrases to express the same context are encoded with the same semantic label. In various embodiments, the question recommendation system generates a semantic label by converting the survey prompt to an n-dimensional vector. For example, the question recommendation system can convert the survey prompt into a uniform length multi-dimensional vector of values. Then, using the vector, the question recommendation system can identify a location within semantic space (e.g., n-dimensional space) that is mapped to a semantic label. Further, the question recommendation system can associate the semantic label of the location to the survey prompt.

As mentioned above, the question recommendation system can identify a survey graph that has a node corresponding to the semantic label (e.g., the semantic label of the received survey prompt). For example, in various embodiments, the question recommendation system uses the semantic label associated with the received survey prompt to identify survey graphs in a survey graph database that have the same (or a similar) semantic label. In some embodiments, the question recommendation system can select a survey graph from among multiple survey graphs that have a corresponding semantic label, as will be further described below.

Upon identifying a survey graph based on the semantic label, the question recommendation system can traverse the nodes of the survey graph to identify an additional node. In one or more embodiments, the question recommendation system identifies the next adjacent node in the survey graph as the additional node. In some embodiments, the question recommendation system identifies a previous node in the survey graph as the additional node. In other embodiments, the question recommendation system identifies a non-adjacent node later in the survey graph as the additional node. For example, in one or more embodiments, the question recommendation system traverses the survey graph to identify the additional node based on response metrics associated with the node. For example, the question recommendation system selects a node in the survey graph as the additional node based on the node satisfying a response metric threshold. Examples of response metrics include response rate, response category, usage rate, drop-off rate, skip-rate, and dwell time.

As mentioned above, the question recommendation system can provide a suggested survey question to the client device based on the identified additional node. For instance, in some embodiments, the question recommendation system identifies a survey prompt type and survey prompt wording from the additional node and provides either or both via the suggested survey prompt. In addition to providing suggested questions, the question recommendation system can also provide additional recommendations to optimize the survey being built. For example, in various embodiments, the question recommendation system recommends one or more nodes to remove from the survey being built by the user. In some embodiments, the question recommendation system recommends reordering the prompts (e.g., questions) in the survey. In further embodiments, the question recommendation system recommends re-wording a survey prompt. Each of these optimization recommendations is detailed below.

The question recommendation system provides many advantages and benefits over conventional systems and methods. For example, the question recommendation system reduces inefficiencies across computing devices. To illustrate, the question recommendation system provides building tools that optimize surveys being created. In particular, in various embodiments, the question recommendation system optimizes survey creation by providing suggested questions that are more likely to invoke quality answers by respondents. In addition, the question recommendation system optimizes surveys by providing recommendations with respect to question type, ordering, and phrasing.

Indeed, the question recommendation system improves computer functionality by reducing wasted computing resources, processing time, and redundant overhead that results from inefficient and unoptimized surveys being created and sent to respondent client devices. More specifically, the total number of surveys distributed across networks to computing devices is reduced as fewer respondents are needed to achieve the same number of quality responses compared to conventional survey creation systems. As an additional result, less storage and processing resources are needed at the digital survey system to process the survey results, as fewer survey results are obtained (and processed) due to the increased response quality.

As another benefit, the question recommendation system efficiently analyzes different (i.e., heterogeneous) survey questions (i.e., prompts) by encoding the survey questions into a uniform representation (e.g., multi-dimensional vectors). In particular, by transforming the distinct and assorted survey questions into a structured datatype (e.g., an embedding), the question recommendation system can more accurately determine the context, effects, weights, and influences resulting from survey questions. Further, the question recommendation system can utilize the transformed survey prompts to generate and identify semantic labels that categorize each survey prompt.

As a further benefit, the question recommendation system provides increased flexibility over conventional survey creation systems. For example, the question recommendation system provides recommendations individually tailored to the users. Indeed, the question recommendation system suggests survey optimizations to a user via a client device based on previously collected survey data, patterns of the creating user, and/or emergent patterns from other users. In this manner, the question recommendation system flexibly identifies recommendation options and suggestions that both advances a user's needs as well as optimizes the survey being built by the user.

As is apparent by the foregoing discussion, the present disclosure utilizes a variety of terms to describe features and advantages of the question recommendation system. Additional detail is now provided regarding these and other terms used herein. For example, as used herein, the terms "survey question," "question prompt," "survey prompt," or simply "prompt" refer to an electronic communication used to collect information. In particular, the term "prompt" can include an electronic communication that causes a client device to present a digital query that invokes or otherwise invites a responsive interaction from a respondent of a respondent client device. While a prompt primarily includes a survey question, in some embodiments, a prompt includes a statement or comment of instruction or information to a respondent.

As used herein, the terms "survey response," "question response," "prompt response," or simply "response" refer to electronic data provided in response to a prompt. The electronic data may include content and/or feedback based on user input from the respondent in reply to a prompt. A response may include, but is not limited to, a selection, a text input, an indication of an answer selection, an image or map selection, a user-provided answer, and/or an attachment. For example, a response to an opened-ended prompt can include free-form text (i.e., a text response).

The term "semantic label" refers to a categorical identifier that describes the meaning of a prompt. In particular, the term "semantic label" refers to a coded tag based on the context (e.g., characteristics and attributes) of the words used in the survey prompt. Indeed, prompts with different words but the same meaning or context can share the same or a similar semantic label. A prompt can include multiple levels of semantic labels, each subsequent label further describing the context of the prompt. As described below, in various embodiments, the question recommendation system generates and utilizes multi-dimensional semantic space to organize semantic labels relative to each other. In some embodiments, the question recommendation system can assign semantic labels to answers choices and/or responses.

In addition, the term "survey graph" refers to a data structure that conveys information about multiple survey prompts in an organized manner. In particular, the term "survey graph" refers to a list, sequence, arrangement, ordering, or series of survey prompt elements. For example, in some embodiments, a survey graph includes a sequence of connected nodes, where each node corresponds to a semantic label assigned to a survey prompt, and where the nodes are ordered according to the survey ordering of corresponding survey prompts. In another example, the survey graph is an array of survey prompts found in the survey.

In addition, each element (e.g., node) in a survey graph can include additional information and metadata associated with the corresponding survey prompt from the survey. For example, each element includes the question wording or phrasing, question type, responses, and response metrics/statistics of the survey prompt. For instance, a survey node corresponding to a survey prompt within a survey graph indicates the response rate, dwell time, and drop-off rate associated with responses of the survey prompt.

Furthermore, for purposes of describing one or more embodiments disclosed herein, reference is made to survey questions (i.e., survey prompts) and survey responses. One will appreciate that while reference is made to survey-related questions and responses, the same principles and concepts can be applied to other types of content items.

Additional detail will now be provided regarding the question recommendation system in relation to illustrative figures portraying example embodiments. For example, FIG. 1 illustrates a schematic diagram of an environment 100 in which the question recommendation system 106 can operate in accordance with one or more embodiments. As illustrated, environment 100 includes a server device 102 and client devices (i.e., administrator client device 114 and respondent client devices 118) connected by the network 122. Additional details regarding the various computing devices (e.g., the server device 102, client devices 114, 118, and network 122) are explained below with respect to FIGS. 12 and 13.

As shown, the server device 102 hosts a digital survey system 104 and the question recommendation system 106. In general, the digital survey system 104 facilitates the creation, administration, and analysis of electronic surveys. For example, the digital survey system 104 enables a user (e.g., an administrative user), via the administrator client device 114, to create, modify, and run a digital survey that includes various prompts (e.g., electronic survey questions). In addition, the digital survey system 104 provides survey prompts to, and collects responses from, respondents (i.e., responding users) via the respondent client devices 118.

In addition, the digital survey system 104 includes the question recommendation system 106. In various embodiments, the question recommendation system 106 provides optimizing suggestions to a client device of a user creating a survey. For example, the question recommendation system 106 provides suggested questions to add to a survey. As another example, the question recommendation system 106 recommends reordering, rephrasing, and/or removing survey questions to improve a respondent's experience with the survey, which in turn, results in more completed surveys and higher-quality responses by respondents.

To briefly illustrate, the question recommendation system 106 receives a survey question as input from a user building a survey. In response, the question recommendation system 106 converts the question into a semantic label. Utilizing the semantic label, the question recommendation system 106 locates a survey question in a survey graph that corresponds with the semantic label. Then, from the survey question in the survey graph, the question recommendation system 106 can identify and provide a suggested question to the user to include in their survey. Details regarding providing a suggested question are given with respect to FIG. 5 below.

As shown, the question recommendation system 106 includes a semantic space 108, a survey graph database 110, and a question phrasing database 112. In one or more embodiments, the semantic space 108 is a multi-dimensional domain database that stores semantic labels in organized relationships. In some embodiments, the semantic space 108 is made up of n-dimensional vectors, where n represents the number of latent features. In many embodiments, the semantic space 108 is the result of machine learning and neural networks trained to create semantic label embeddings, as described below with respect to FIGS. 3B-3C.

The survey graph database 110 includes a database of survey graphs having one or more nodes. For example, each survey graph in the survey graph database 110 represents a previous survey executed by the digital survey system 104. As mentioned above, a survey graph is made up of a sequence of nodes based on prompts and corresponding responses. In addition, each node can include a semantic label generated for the corresponding prompt within the node. Thus, the question recommendation system 106 can search for survey graphs in the survey graph database 110 based on semantic label and/or other survey characteristics.

The question phrasing database 112 includes a database of prompts along with corresponding response metric analytics (e.g., response rate, question category, question type, etc.). In addition, the prompts can be grouped by semantic label. Indeed, for each semantic label, the question phrasing database 112 can include multiple versions of a survey question along with response metrics indicating the version's effectiveness. In this manner, the question recommendation system 106 can utilize the question phrasing database 112 to determine alternative or more favorable wording for a question. Additional detail regarding recommending question phrasing is described below with respect to FIGS. 9A-9B.

As shown, the environment 100 includes the administrator client device 114 and the respondent client device 118. The administrator client device 114 includes an administrator application 116 that enables a user (e.g., an administrator) to access the digital survey system 104 and/or question recommendation system 106. For example, while creating or editing a survey using the administrator application 116, the question recommendation system 106 provides suggested questions to the user to add to the survey. Similarly, the respondent client devices 118 include response applications 120 that enable respondents to complete digital surveys provided by the digital survey system 104. In some embodiments, the administrator application 116 and/or the response applications 120 include web browsers that enable access to the digital survey system 104 and/or question recommendation system 106 via the network 122.

Although FIG. 1 illustrates a minimum number of computing devices, the environment 100 can include any number of devices, including any number of server devices and/or client devices. In addition, while in the environment 100 shown one arrangement of computing devices, various arrangements and configurations are possible. For example, in some embodiments, the administrator client device 114 may directly communicate with the server device 102 via an alternative communication network, bypassing the network 122.

In various embodiments, the question recommendation system 106 can be implemented on multiple computing devices. In particular, and as described above, the question recommendation system 106 may be implemented in whole by the server device 102 or the question recommendation system 106 may be implemented in whole by the administrator client device 114. Alternatively, the question recommendation system 106 may be implemented across multiple devices or components (e.g., utilizing the server device 102 and the administrator client device 114).

To elaborate, in various embodiments, server device 102 can also include all, or a portion of, the question recommendation system 106, such as within the digital survey system 104. For instance, when located on the server device 102, the question recommendation system 106 includes an application running on the server device 102 or a portion of a software application that can be downloaded to the administrator client device 114 (e.g., the administrator application 116). For example, the question recommendation system 106 includes a networking application that allows an administrator client device 114 to interact (e.g., build surveys) via network 122 and receive suggestions (e.g., suggested questions) from the question recommendation system 106.

The components 104-112 and 116 can include software, hardware, or both. For example, the components 104-112 and 116 include one or more instructions stored on a computer-readable storage medium and executable by processors of one or more computing devices, such as a client device or server device. When executed by the one or more processors, the computer-executable instructions of server device 102 and/or administrator client device 114 can cause the computing device(s) to perform the feature learning methods described herein. Alternatively, the components 104-112 and 116 can include hardware, such as a special-purpose processing device to perform a certain function or group of functions. Alternatively, the components 104-112 and 116 can include a combination of computer-executable instructions and hardware.

Furthermore, the components 104-112 and 116 are, for example, implemented as one or more operating systems, as one or more stand-alone applications, as one or more modules of an application, as one or more plug-ins, as one or more library functions or functions called by other applications, and/or as a cloud computing model. Thus, the components 104-112 and 116 can be implemented as a stand-alone application, such as a desktop or mobile application. Furthermore, the components 104-112 and 116 can be implemented as one or more web-based applications hosted on a remote server. The components 104-112 and 116 can also be implemented in a suite of mobile device applications or "apps."

Figure 3A:
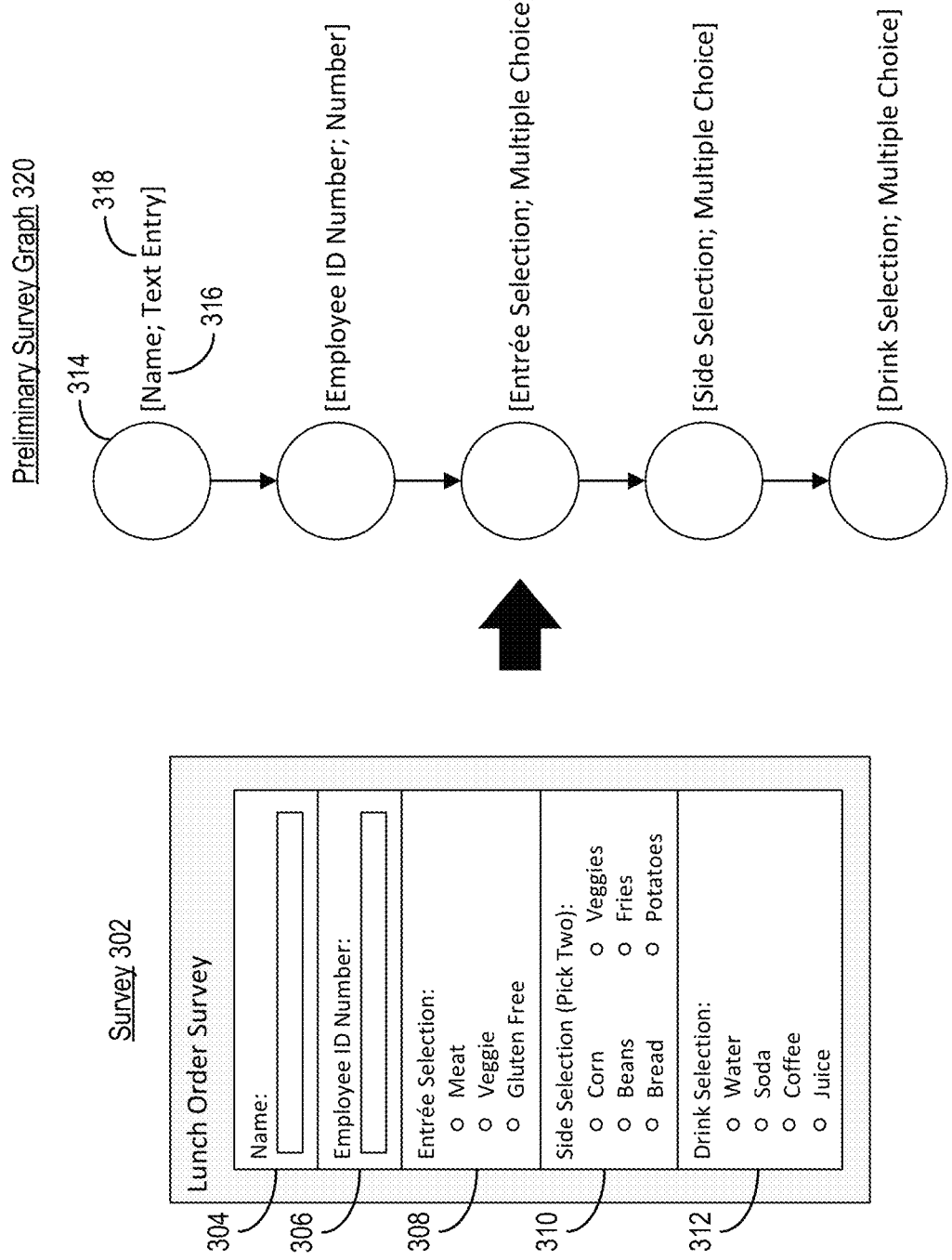
FIGS. 3A-3C illustrate example diagrams of generating a survey graph in accordance with one or more embodiments.
Figure 3B:
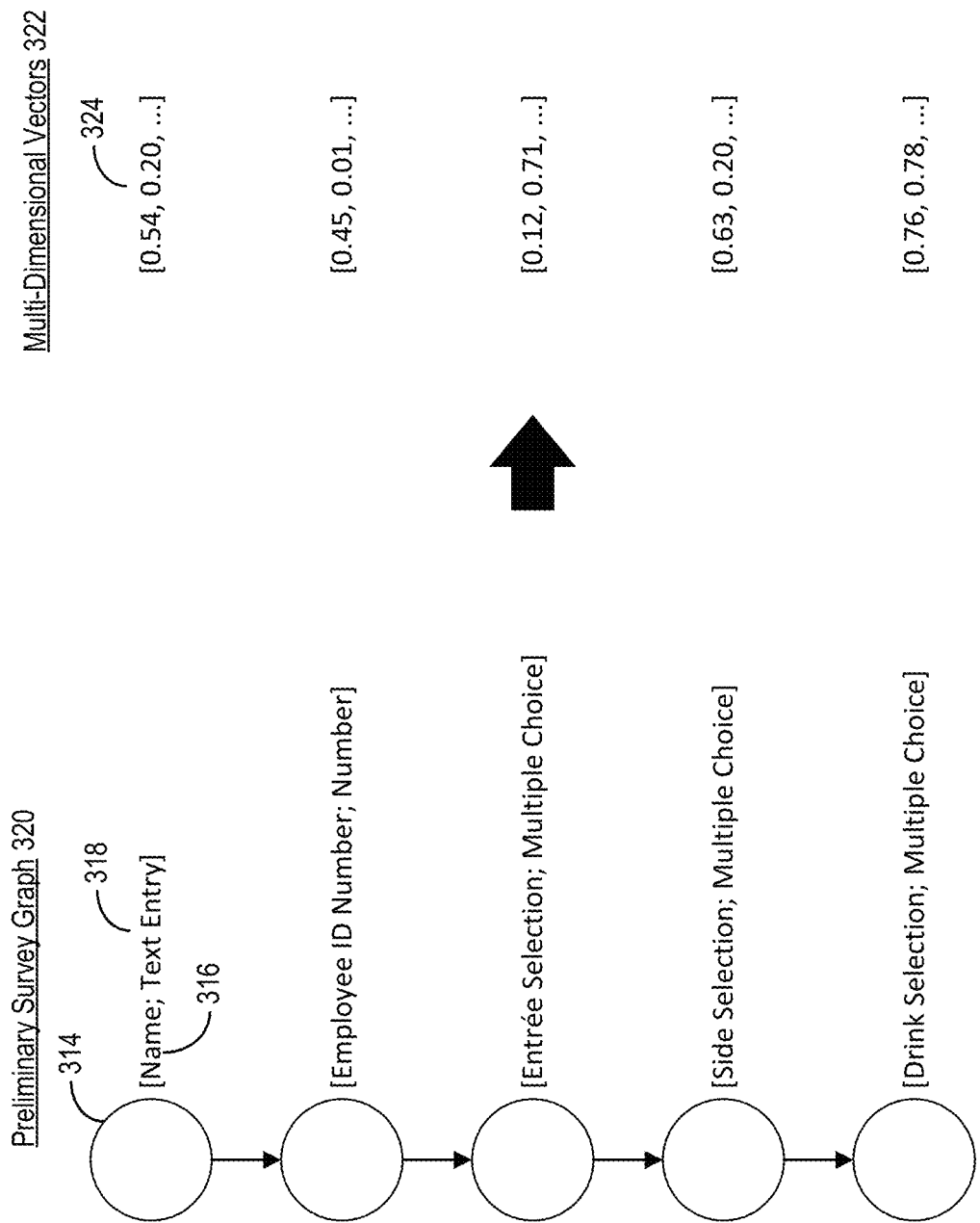
Figure 3C:
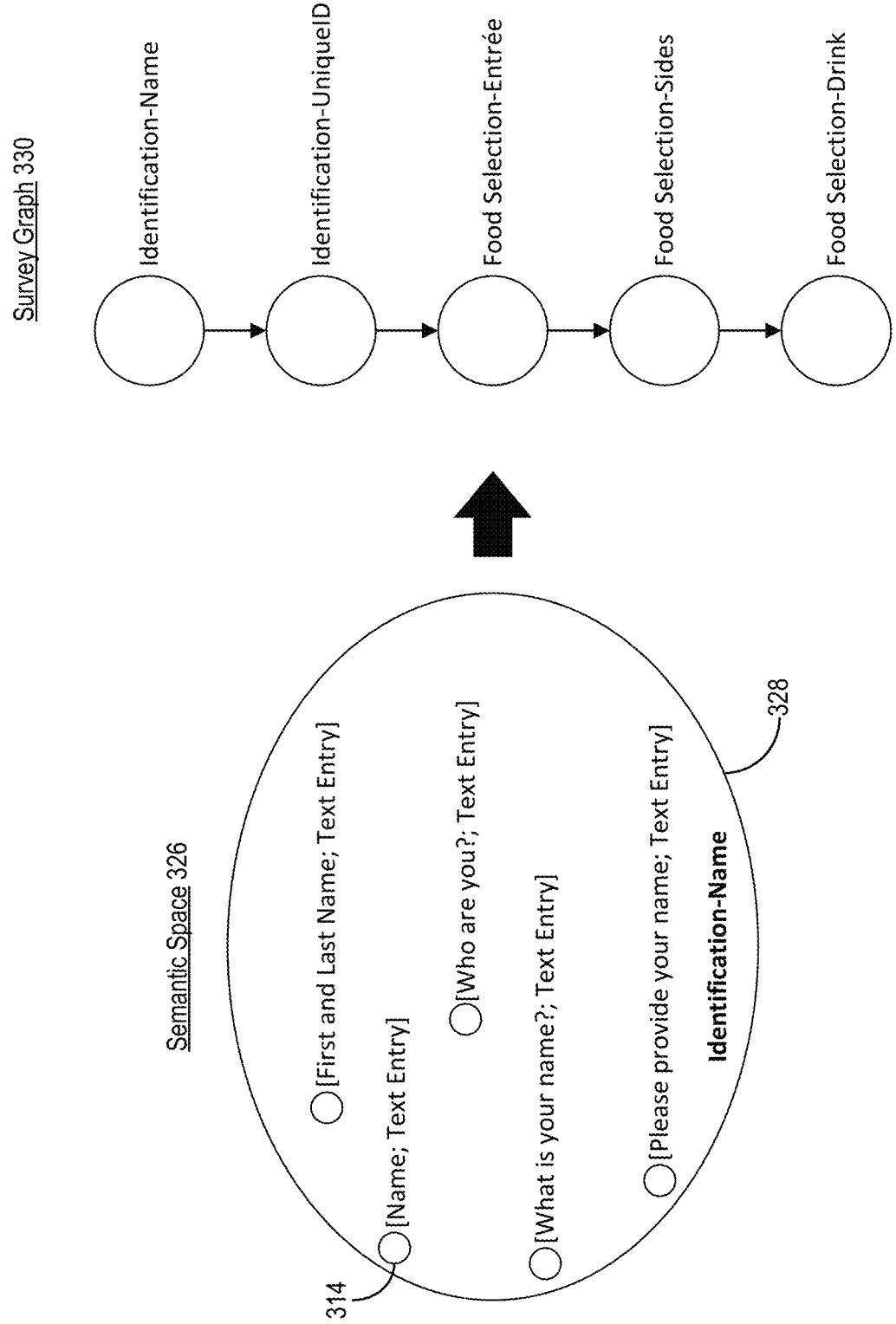
Figure 4:
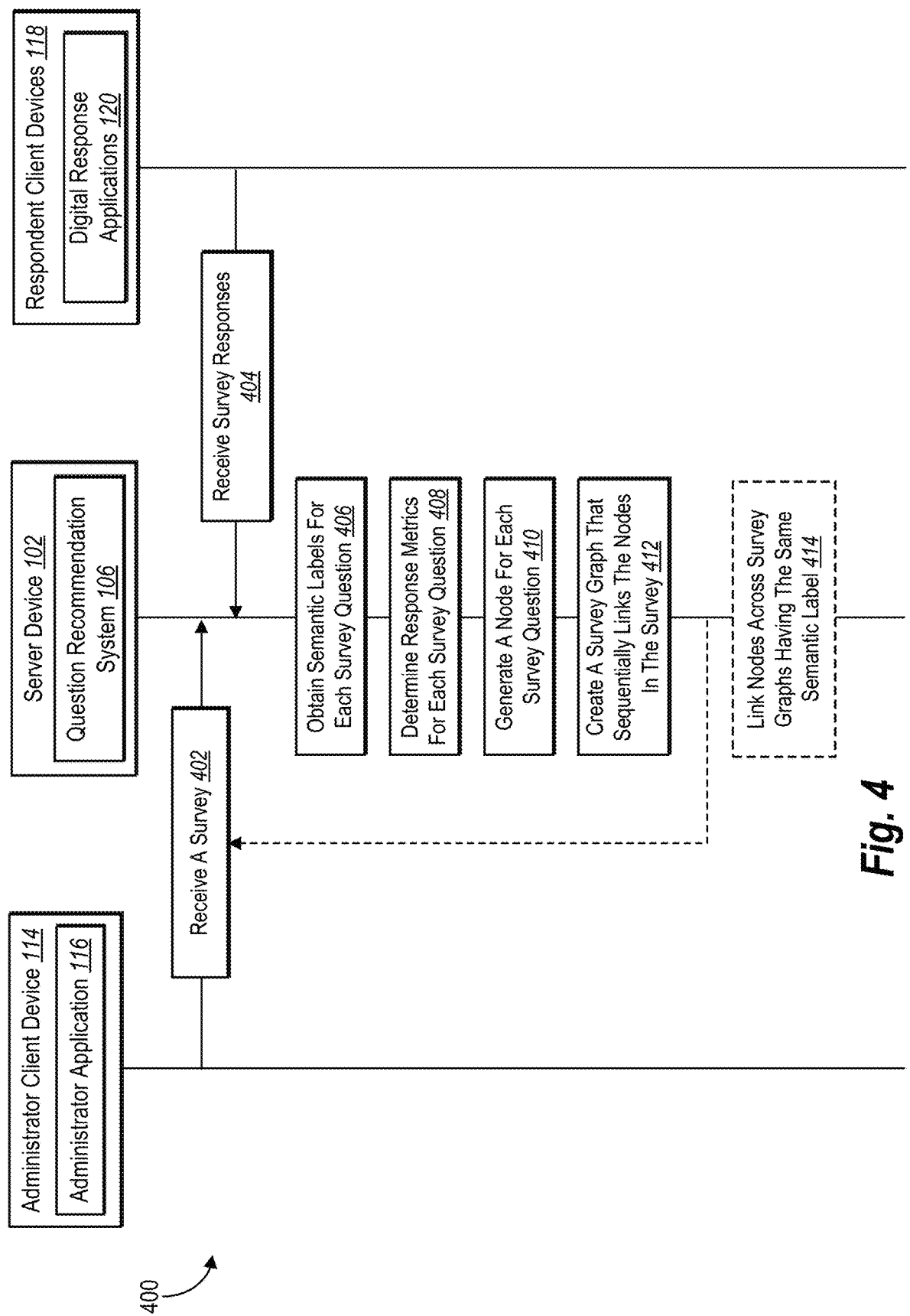
FIG. 4 illustrates an example sequence diagram creating a survey graph database in accordance with one or more embodiments.
Figure 5:
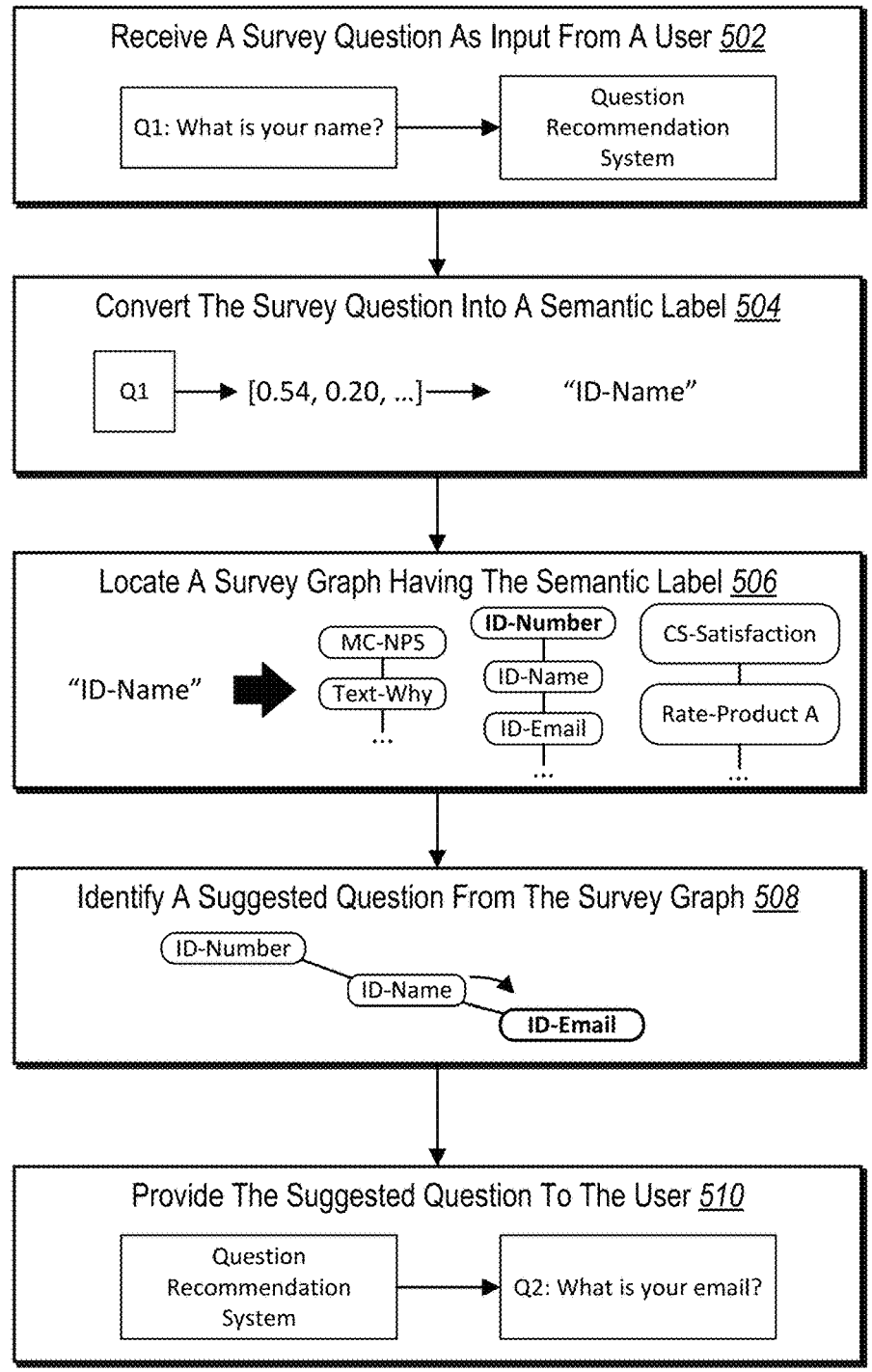
FIG. 5 illustrates a schematic diagram of providing a suggested question in accordance with one or more embodiments.

As an overview, the question recommendation system 106 utilizes both a semantic space and a survey graph database as part of providing a suggested question. To elaborate, FIG. 2 corresponds to generating and utilizing semantic space. FIGS. 3A-3C and FIG. 4 corresponds to generating and utilizing a survey graph database. FIG. 5 corresponds to providing a suggested question to a user by utilizing the semantic space and the survey graph database.

Figure 2:
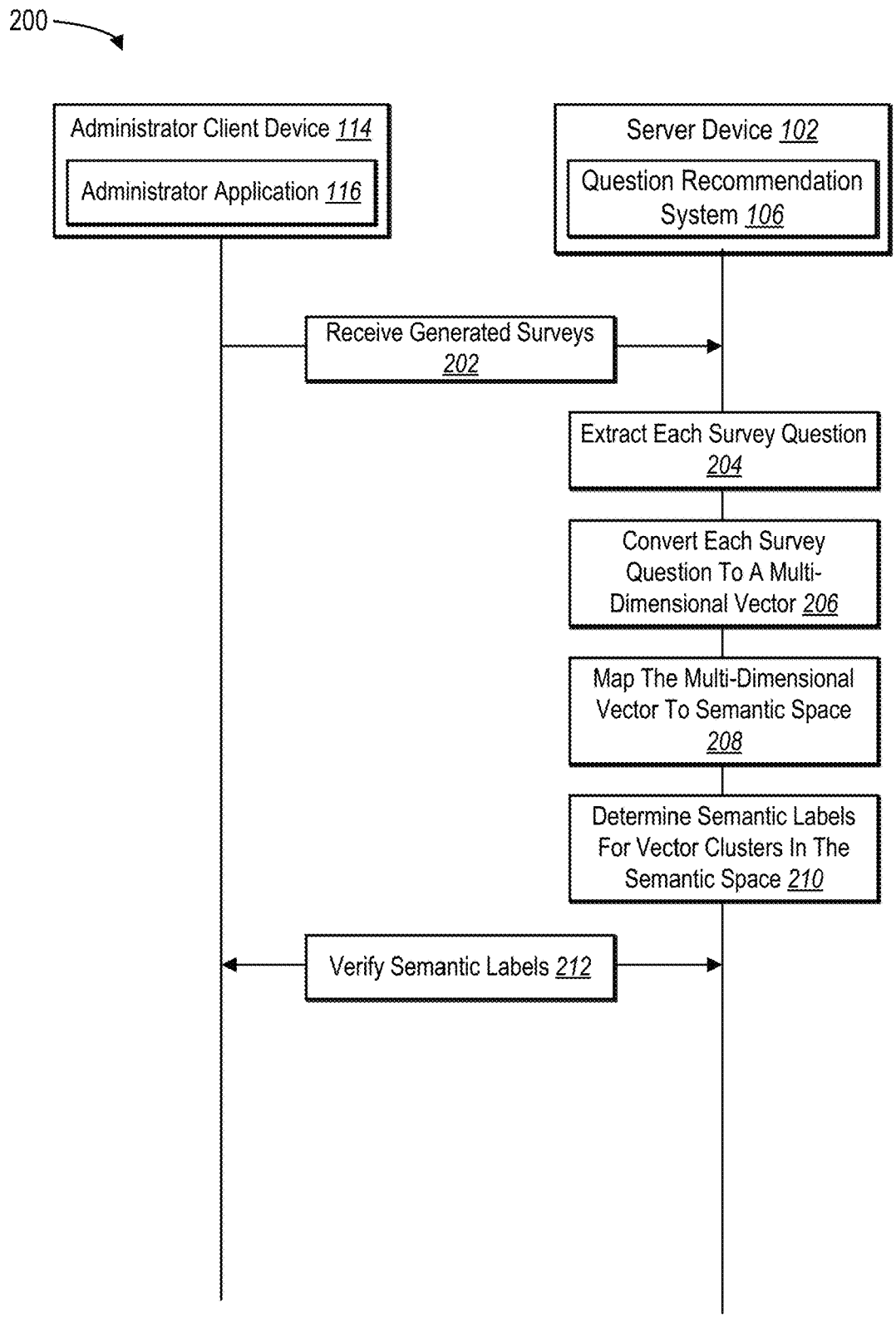
FIG. 2 illustrates an example sequence diagram of determining semantic labels in accordance with one or more embodiments.

As mentioned, FIG. 2 illustrates a sequence diagram 200 for determining semantic labels utilizing a semantic space in accordance with one or more embodiments. As shown, the sequence diagram 200 includes the administrator client device 114 and the server device 102 having the question recommendation system 106. While not illustrated, the question recommendation system 106 can be implemented within a digital survey system located on the server device 102.

As shown in FIG. 2, the question recommendation system 106 receives 202 generated surveys from the administrator client device 114. For example, an administrator (i.e., user) can generate numerous surveys over time and provide the surveys to the question recommendation system 106. In some embodiments, the question recommendation system 106 receives a collection of surveys from additional or alternative sources, such as surveys stored on the digital survey system.

Each of the generated surveys can include multiple questions. In addition, each of the questions can include specific words or phrases of text that make up the question. Further, the survey questions can vary by question type (e.g., multiple choice, open-ended, ranking, scoring, summation, demographic, dichotomous, differential, cumulative, drop-down, matrix, net promoter score (NPS), single textbox, heat map, etc.).

As shown, the question recommendation system 106 can extract 204 each survey question from the generated surveys. For instance, the question recommendation system 106 parses or otherwise isolates the text from each survey question. In some embodiments, the question recommendation system 106 can identify and/or tag the text of each question with corresponding information, such as a unique question identifier, a survey identifier, etc.

In additional embodiments, the question recommendation system 106 also extracts and associates corresponding text responses (e.g., survey answers), or portions thereof, to strengthen the context or meaning of the question. For example, questions that ask about a particular item will often receive text responses that describe or characterize the items using a variety of terms. Indeed, relevant terms about the item will appear more frequently than trivial or non-relevant terms. Thus, in some embodiments, the question recommendation system 106 associates text responses, or relevant terms from text responses with a question to better identify the context of the question.

In addition, the question recommendation system 106 converts 206 each survey question to a multi-dimensional vector. For instance, the question recommendation system 106 utilizes a machine-learning algorithm or model to transform the text of the question to a vector (e.g., a feature vector). In one or more embodiments, the question recommendation system 106 employs a word2vector machine-learning model to convert the text of a question to a feature vector. Commonly, word2vector neural networks include a group of related models that produce word embeddings given a set of words. Indeed, word2vector neural networks are two-layer neural networks that produce a vector space. In alternative embodiments, the question recommendation system 106 trains and/or utilizes another type of machine-learning model to generate multi-dimensional vectors for the text of questions.

As mentioned above, the question recommendation system 106 can generate an n-dimensional vector, where n corresponds to the number of latent features used to represent a survey question in vector space. Indeed, an n-dimensional vector corresponds to n-dimensional semantic space. In many embodiments, n is hundreds of dimensions.

Upon generating a vector for each question, the question recommendation system 106 maps 208 the multi-dimensional vector to semantic space. For example, the question recommendation system 106 correlates the n-dimensional vector to n-dimensional semantic space. In this manner, survey questions that have the same representative features will map to locations near each other in semantic space. Similarly, survey questions having different context will be located farther away within the semantic space.

As shown in FIG. 2, the question recommendation system 106 can determine 210 semantic labels for vector clusters in the semantic space. For example, in some embodiments, the question recommendation system 106 can utilize clustering (e.g., k-means clustering, etc.) to identify groups of questions converted to vectors. Also, the question recommendation system 106 can assign semantic labels based on the text responses that correspond to each cluster. For example, the question recommendation system 106 analyzes the clusters of questions to determine the most frequently occurring words or phrases, which are then used as the semantic label for the cluster.

In alternative embodiments, the question recommendation system 106 can generate the semantic space in connection with training a neural network to converts text to vectors. For example, the question recommendation system 106 can tag vectors with annotated semantic labels before mapping the vector to the semantic space. In this manner, the locations within the semantic space become associated with specific semantic labels during training.

As illustrated, the question recommendation system 106 can communicate with the administrator client device 114 to verify 212 the semantic labels. For example, the question recommendation system 106 provides the learned semantic label to the administrator client device 114 and an administrator verifies and/or edits the semantic label automatically determined by the question recommendation system 106. Further, based on initial feedback from the administrator client device 114, the question recommendation system 106 can further train the neural network and/or semantic space to increase the future accuracy of converting survey questions to semantic labels.

As mentioned above, FIGS. 3A-3C and FIG. 4 correspond to generating and utilizing a survey graph database. In particular, FIGS. 3A-3C illustrate generating a survey graph in accordance with one or more embodiments. FIG. 4 illustrates creating a survey graph database.

As FIG. 3A illustrates, a survey 302 includes questions 304-312. For example, the survey 302 is created by an administrator via an administrator client device. In various embodiments, a digital survey system has previously administrated the survey 302 to respondents. Accordingly, each of the questions 304-312 is associated with corresponding responses from the respondents that completed the survey.

In one or more embodiments, the question recommendation system 106 imports the survey and extracts or otherwise obtains the questions 304-312. For each of the questions 304-312, the question recommendation system 106 generates a node representing the question within a survey graph. As shown, the question recommendation system 106 generates a first node 314 to represent the first question 304 of the survey 302. The first node 314 includes the text 316 of the first question 304. In some embodiments, such as the illustrated embodiment, the first node 314 also includes the question type 318 of the first question 304. In additional embodiments, the first node 314 can include additional data and/or metadata associated with the question. For example, the first node 314 includes identifiers (e.g., a survey identifier or a question identifier) classification information (e.g., question tags or a survey category) or response metrics (e.g., response rate, dwell-time, drop-off rate, etc.).

As shown in FIG. 3A, the question recommendation system 106 links the nodes together to form a preliminary survey graph 320. In particular, the nodes are arranged in sequential order to match the order found in the survey 302. Sequentially linking the nodes together enables the question recommendation system 106 to detect common patterns between questions across various survey graphs, as described further below. The preliminary survey graph 320 is also shown in FIG. 3B.

To obtain a finalized survey graph, the question recommendation system 106 needs to generate semantic labels for each of the questions 304-312. As part of generating semantic labels, the question recommendation system 106 converts the text of each of the questions 304-312 into multi-dimensional vectors 322, as shown in FIG. 3B. As explained earlier, the question recommendation system 106 can utilize a machine-learning algorithm to convert a question into a multi-dimensional vector. Indeed, as shown, the question recommendation system 106 converts the text 316 of the first node 314 corresponding to the first question 304 into a first n-dimensional vector 324.

Next, using the multi-dimensional vectors 322, the question recommendation system 106 can determine semantic labels. In particular, in one or more embodiments, the question recommendation system 106 plots each of the questions 304-312 in semantic space utilizing the multi-dimensional vectors of the questions. To illustrate, FIG. 3C shows the question recommendation system 106 mapping the first node 314 (representing the first question 304) in a portion of semantic space 326 based on the first n-dimensional vector 324. Indeed, the question recommendation system 106 aligns the coordinates provided by the first n-dimensional vector 324 with the n-dimensions of the semantic space 326 to place the first node 314 (along with accompanying text 316) of the first question 304 within the semantic space 326. Notably, for ease of explanation, FIG. 3C illustrates an example representation of a minor portion of the semantic space 326.

As described earlier, different portions of the semantic space 326 can be associated with different semantic labels. In this manner, when a question is mapped to a particular location within the semantic space 326, the question is placed near other questions (e.g., a cluster) sharing the same semantic label (i.e., context). As shown in the semantic space 326 in FIG. 3C (left), each of the questions (represented by nodes) are within the portion of semantic space 326 associated with the semantic label 328 of "Identification-Name."

More specifically, FIG. 3C (left) illustrates the mapped location of the first node 314 in the semantic space 326 places the first node near other nodes/questions having the same context as the first question 304. Indeed, each of the nodes/questions shown in the semantic space 326 share the same semantic label 328. Accordingly, the location of the first node 314 within the semantic space 326 indicates that the first question inherits the semantic label 328 of "Identification-Name."

In one or more embodiments, the question recommendation system 106 can assign semantic labels having more or less specificity. Indeed, the semantic space 326 can include a hierarchy of clusters of semantic labels, where a higher level cluster includes one or more lower level sub-clusters. For example, a top-level cluster has the semantic label of "Identification" and includes lower level sub-clusters having the semantic labels of "Identification-Name," "Identification-Email," "Identification-Address," etc. In addition, the sub-cluster having the semantic label of "Identification-Name" can include further sub-clusters having the semantic labels of "Identification-Name-First," and "Identification-Name-Last." In this manner, each sub-cluster inherits the properties of its parent cluster. This hierarchy structure can also locate sibling clusters near each other in the semantic space 326.

Upon obtaining semantic labels for each of the questions 304-312, the question recommendation system 106 adds the semantic labels to the survey graph. As shown in FIG. 3C (right), the completed survey graph 330 includes nodes represented by semantic labels rather than by question text. In this manner, the question recommendation system 106 converts the survey 302 into a sequence of semantic labels, which can reveal patterns about the survey relative to other surveys.

Further, the question recommendation system 106 can store the survey graph 330 in a survey graph database. To illustrate, FIG. 4 shows sequence 400 for creating a survey graph database in accordance with one or more embodiments. As shown, FIG. 4 includes communications between the question recommendation system 106 on the server device 102 and client devices (e.g., the administrator client device 114 and respondent client devices 118).

As shown, the question recommendation system 106 receives 402 a survey from an administrator client device, such as the survey 302 described above. In addition, the question recommendation system 106 receives 404 survey responses from respondent client devices 118. For example, respondents provide responses to the question recommendation system 106 in connection with a digital survey system administering the survey to the respondents.

In addition, as shown, the question recommendation system 106 obtains 406 semantic labels for each survey question. For example, the question recommendation system 106 converts each question to an n-dimensional vector and maps the vector to the semantic space to determine a semantic label for the question, as described above.

Further, in various embodiments, the question recommendation system 106 determines 408 response metrics for each survey question. As mentioned above, response metrics can include response rate, response type, response category, usage rate, drop-off rate, skip rate, and dwell time. The question recommendation system 106 can gather and associate more or fewer response metrics with each survey question.

To elaborate, a response rate includes the number or percentage of respondents who respond to a question upon viewing the question. A response type includes what type of response or answer a respondent provided to a question. For example, response types can include multiple choice, short text response, essay text response, multiple selection, slider selection, heatmap selection, etc. A response category includes tags or classifications associated with the question or the corresponding responses. In some embodiments, a response category includes portions of answers provided by respondents.

Additionally, a usage rate includes the number or percentage of surveys that include a particular question and/or the specific semantic label. For example, the question recommendation system 106 indicates that the semantic label of "Identification" is included in 85% of all surveys administered in the past month and/or associated with a given survey category. A drop-off rate includes the number or percentage of respondents that prematurely terminate a survey on a given question rather than moving on to a next question or completing the survey. A skip rate includes the number or percentage of users that skip or ignore a question or leave the question blank. Dwell time includes an amount of time (actual time or relative to other questions) that respondents spend on a question.

As shown, the question recommendation system 106 generates 410 a node for each survey question. As part of generating a node for a question, the question recommendation system 106 associates the semantic label and response metrics with the node. In addition, the question recommendation system 106 includes the question text, question type, and other data and/or metadata with the node. Notably, the question recommendation system 106 can generate the node before, after, or along with generating a semantic label.

Upon generating a node for each survey question, the question recommendation system 106 creates 412 a survey graph that sequentially links the nodes in the survey. Creating a survey graph from nodes is described above in connection with FIGS. 3A-3C (e.g., survey graph 330). Further, the question recommendation system 106 can repeat acts 402-412 in the sequence 400 for additional surveys to build the survey graph database.

As shown, the question recommendation system 106 can optionally link 414 nodes across survey graphs having the same semantic label. For example, as part of building the survey graph database, the question recommendation system 106 can form connections between similar nodes and patterns of similar nodes. To illustrate, the question recommendation system 106 can link nodes together that have the same semantic label. In particular, the question recommendation system 106 creates a table that lists each semantic label in the survey graph database and which of the survey graphs include corresponding nodes.

In addition, the question recommendation system 106 can track patterns of two, three, or more sequential semantic labels that are found among multiple survey graphs. For example, the question recommendation system 106 identifies a string of four semantic labels that frequently occur in survey graphs. Later, the question recommendation system 106 can use this pattern of semantic labels to provide one or more suggested questions, as described below.

In one or more embodiments, the question recommendation system 106 can identify strings of nodes that include the same semantic label, but that are arranged in different orders. In these embodiments, the question recommendation system 106 can analyze the response metrics and rank the sequences from most to least favorable. For example, the question recommendation system 106 analyzes the various sequence combinations of the semantic label to determine the pattern or arrangement having the highest response rate, lowest drop-off rate, shortest dwell time, and/or lowest skip rate. Further, as additional response data is received, the question recommendation system 106 can update, re-analyze, and re-rank patterns of nodes in the survey graph database.

As mentioned above, the question recommendation system 106 can suggest questions to a user creating a survey. For example, FIG. 5 illustrates a schematic diagram of a series of acts 500 of providing a suggested question in accordance with one or more embodiments. In particular, the series of acts 500 corresponds to acts performed by the question recommendation system 106.

As shown, the series of acts 500 includes the act 502 of receiving a survey question as input from a user. In one or more embodiments, the question recommendation system 106 receives a survey question from the administrator client device of a user building a survey. In some embodiments, the question recommendation system 106 receives multiple questions selected by the user as input. In alternative embodiments, the question recommendation system 106 receives a portion of a question, such as the first few words of a question or a few keywords that convey the meaning of the question.

In addition, the series of acts 500 includes the act 504 of converting the survey question into a semantic label. As described above, in various embodiments, the question recommendation system 106 transforms the survey question into a multi-dimensional vector. For example, the question recommendation system 106 utilizes a neural network to generate the multi-dimensional vector from the input prompt, as explained earlier. In addition, the question recommendation system 106 can plot the multi-dimensional vector in semantic space (e.g., semantic space 108) and determine a semantic label based on the plotted location within the semantic space, as detailed previously. As illustrated, the act 504 shows the survey question "What is your name?" converted into a multi-dimensional vector, which the question recommendation system 106 then uses to identify the semantic label of "ID-Name."

As shown, the series of acts 500 includes the act 506 of locating a survey graph having the semantic label. For example, using the semantic label determined from the inputted survey question, the question recommendation system 106 finds survey graphs within a survey graph database (e.g., the survey graph database 110) that includes a matching (or close) semantic label. As illustrated in the act 506, the question recommendation system 106 identifies each survey graph having a node with the semantic label of "ID-Name."

In one or more embodiments, when multiple survey graphs are identified having a matching semantic label as the input question, the question recommendation system 106 selects one of the survey graphs based on one or more factors. For example, in some instances, the question recommendation system 106 selects the survey graph having the matching semantic label with the highest response rate (and/or other response metrics). In other instances, the question recommendation system 106 selects the survey graph having the overall highest response rate (and/or other response metrics) averaged across all of the questions in the survey graph, or averaged across all of the questions in the survey graph having the same category as the matched question.

In various embodiments, the question recommendation system 106 identifies survey graphs in the survey graph database that have a similar pattern of semantic labels as the survey (or a portion thereof) being created by the user. For example, the question recommendation system 106 receives two or more questions as input and converts each question to a semantic label. The question recommendation system 106 then searches for survey graphs in the survey graph database that have the same semantic labels (or the closest match based on vector projections and cosine similarity comparisons of the semantic labels in the semantic space).

In some embodiments, the question recommendation system 106 identifies survey graphs in the survey graph database that have the same order of semantic labels as the input questions. For example, the question recommendation system 106 identifies survey graphs that match both the semantic labels and the pattern order of the input questions. In alternative embodiments, the question recommendation system 106 identifies survey graphs that match the semantic labels and are within a threshold distance on each other in the survey graph (e.g., arranged in a different pattern order or having one or more additional nodes beyond those in the pattern).

In embodiments where the question recommendation system 106 utilizes multiple questions as input, the question recommendation system 106 can limit the input questions to those of the same or similar semantic category. For example, if a survey being created has three questions associated with respondent identification followed by two questions associated with product satisfaction, the question recommendation system 106 identifies the change in semantic categories and utilizes the two questions associated with product satisfaction to identify survey graphs in the survey graph database that include suggested questions regarding product satisfaction.

Further, the series of acts 500 includes the act 508 of identifying a suggested question from the survey graph. For example, the question recommendation system 106 traverses down or up the nodes of the one or more survey graphs to identify a suggested question. In many embodiments, the question recommendation system 106 selects the question in the next node as the suggested question, although the question recommendation system 106 can select other questions from the survey graph, as described below in connection with FIGS. 6A-6B. As illustrated in the act 508, the question recommendation system 106 identifies and selects the next node shown as "ID-email" from which to obtain the suggested question.

As mentioned above, the question recommendation system 106 traverses the identified survey graph to determine a suggested question to provide to the user. In some embodiments, the question recommendation system 106 determines which of the other questions in the identified survey graph relate to the input question. For instance, the question recommendation system 106 compares the semantic label of the input question to the semantic labels of the other questions in the identified survey graph to determine which of the other questions relate to the input question. In some cases, the question recommendation system 106 determines relevance based on distance between semantic labels (e.g., n-dimensional vectors) in semantic space, such as all questions in the identified survey graph that have semantic labels within a threshold relevance distance to the semantic label of the input question. If no nodes are within the threshold relevance distance, then the question recommendation system 106 does not return a suggested question.

Upon determining the relevant questions in a survey graph, the question recommendation system 106 can determine which of the questions to select as the suggested question. In some embodiments, the question recommendation system 106 selects the suggested question based on which of the relevant questions has the highest response rate, lowest skip rate, lowest drop-off rate, shortest dwell time, and/or based on other response metrics. In various embodiments, the question recommendation system 106 weights the relevant questions based on their distance (e.g., number of node hops) from the node having the matching semantic label as the input question. For instance, the fewer number of hops, the closer the nodes in the survey graph and the larger the weight applied to the question to be selected as the suggested question.

As mentioned above, the question recommendation system 106 can traverse a survey graph both down and up from the node having the matching semantic label to determine a suggested question. Nodes that are located after or below the matching node are called dependents. Nodes located before or above are called ancestors. Neighbor nodes are adjacent to the node having the matching semantic label. Commonly, the suggested question is drawn from the neighbor descendent node, however, as mentioned above, the suggested question can be from another node on the identified survey graph.

In some embodiments, the question recommendation system 106 suggests multiple questions. For example, the question recommendation system 106 presents two or more suggested question to the user and enables the user to select one or more of the suggested questions. In alternative embodiments, the question recommendation system 106 selects multiple suggested questions and presents the highest ranked suggested question to the user as a first suggested question. If the user accepts the first suggested question, the question recommendation system 106 provides the next highest ranked suggested question as a second suggested question. In alternative embodiments, if the user rejects the first suggested question, the question recommendation system 106 provides the next highest ranked suggested question as the suggested question.

In some embodiments, when the question recommendation system 106 identifies multiple survey graphs that match the semantic label of the input question (e.g., the act 506), the question recommendation system 106 can analyze the survey graphs to determine which suggested question to present to the user. For example, the question recommendation system 106 determines if a given question (i.e., a given semantic label) appears more frequently than other questions. Additionally, or alternatively, the question recommendation system 106 determines if a given question has a more favorable response metric (e.g., highest response rate, lowest skip rate, lowest drop-off rate, shortest dwell time, etc.) that the other questions. In this manner, the question recommendation system 106 utilizes the survey graph database as a whole to determine the suggested question to provide to the user.

In alternative embodiments, when the question recommendation system 106 identifies multiple survey graphs that match the semantic label of the input question, the question recommendation system 106 can compare the neighbor descendent node in each of the identified graphs to determine which node has the most favorable response metric. For example, the question recommendation system 106 identifies the node from among the multiple identified survey graphs that has the highest response rate (and that is related to the node having the matched semantic label). Then, the question recommendation system 106 obtains the suggested question from the identified node.

For ease in explanation, reference above is made to identifying a suggested question from questions of the identified survey graph. More specifically, the question recommendation system 106 can traverse nodes of the identified survey graph to identify semantic labels (rather than questions) that relate to the semantic label of the input question. Upon selecting a node, in various embodiments, the question recommendation system 106 can extract or obtain the text of the node as the suggested question. In additional embodiments, the question recommendation system 106 can suggest different wording or rephrase the question text of the selected node when providing the suggested question, as described below.

As shown in FIG. 5, and as mentioned previously, the series of acts 500 also includes the act 510 of providing the suggested question to the user. In particular, the question recommendation system 106 provides the suggested question to the administrator client device for display to the user. In some embodiments, the administrator client device displays the suggested question in line with a survey being created by the user, as described below. As shown in the act 510, the question recommendation system 106 provides the suggested question of "What is your email?" for the user to add to the survey they are creating.

In some embodiments, the question recommendation system 106 provides additional information as to why a particular suggested question was selected. For example, the question recommendation system 106 indicates the number or percent of surveys having the input question that included the suggested question next. In addition, the question recommendation system 106 can indicate that the suggested question has a high response rate or other response metrics. In some embodiments, as described below, this additional information is provided to a user upon request.

Similarly, in various embodiments, the question recommendation system 106 can provide additional survey optimization tools as further described below. For example, the question recommendation system 106 provides recommendations to reorder questions in the survey, change the question type of a question, and/or rephrase a particular survey question.

Figure 6A:
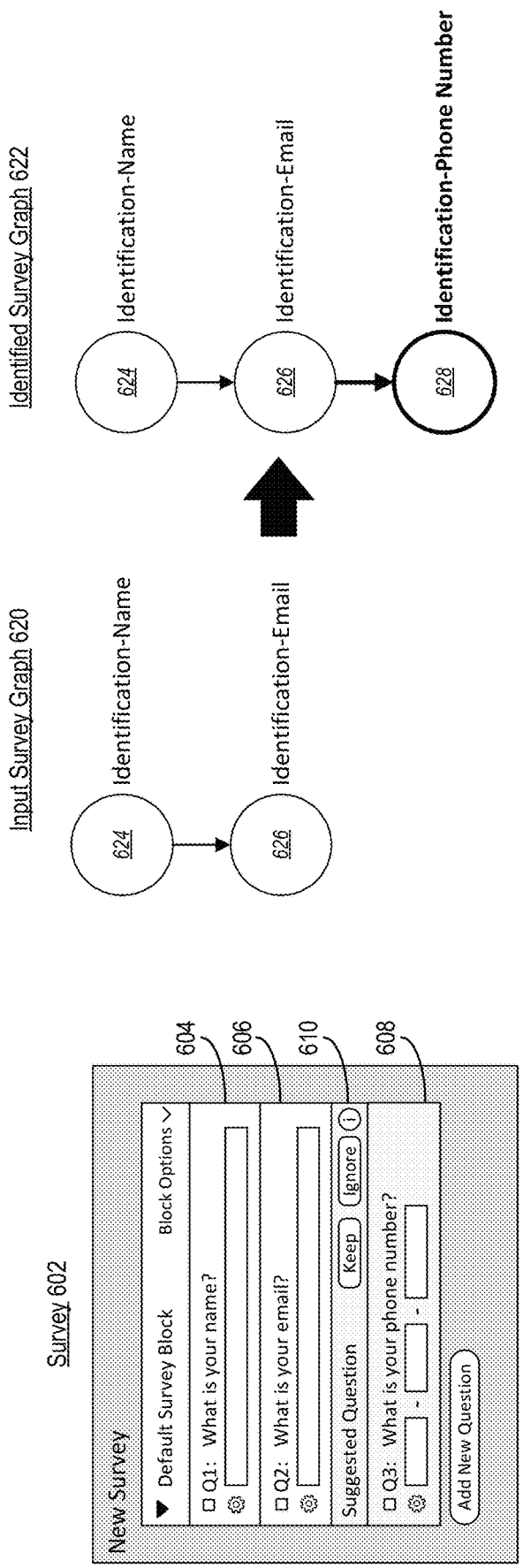
FIGS. 6A-6B illustrate examples of providing suggested question in accordance with one or more embodiments.
Figure 6B:
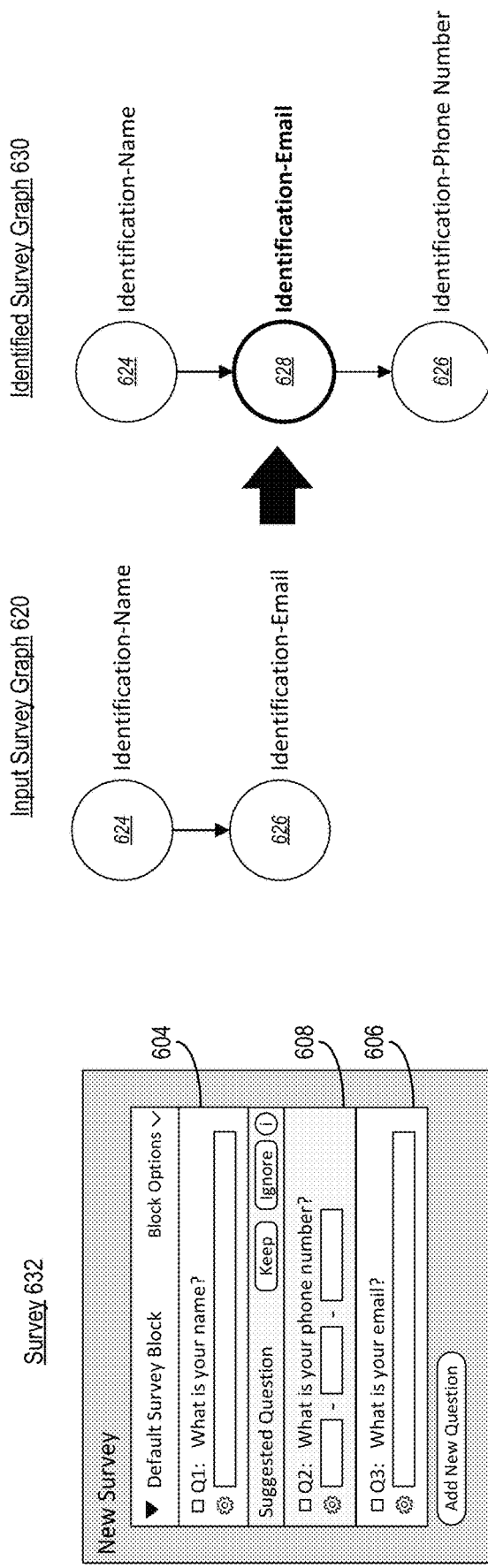

As mentioned above, the question recommendation system 106 provides suggested questions to users creating surveys. To illustrate, FIGS. 6A-6B shows various graphical user interfaces for providing suggested question in accordance with one or more embodiments. For instance, as shown in FIG. 6A, the question recommendation system 106 provides a first graphical user interface 602. In various embodiments, the question recommendation system 106 provides the first graphical user interface 602 to an administrator client device for display to a user, as described previously. In some embodiments, an administrator application on the administrator client device provides a survey creation tool that includes the first graphical user interface 602.

In FIG. 6A, the first graphical user interface 602 relates to a user creating a new survey. As illustrated, the user has selected a first question 604 (i.e., Q1) and a second question 606 (i.e., Q2) to include in the survey. Upon the user adding at least the second question to the survey, the question recommendation system 106 receives the second question 606 and identifies a suggested question to recommend to the user, as described above. As shown, the question recommendation system 106 provides the suggested question 608 (i.e., Q3) to the user displayed in line with the other selected question within the survey being created.

As illustrated, the suggested question 608 corresponds to the previous questions. For example, the suggested question is "What is your phone number?" Indeed, the suggested question is an identification-based question that matches those of the first two questions, but obtains different respondent information.

In various embodiments, the question recommendation system 106 provides options 610 for the user to keep or ignore the suggested question 608. For example, if the question recommendation system 106 detects the user selecting the option to keep the suggested question 608, the question recommendation system 106 adds the suggested question 608 to the survey being created. Otherwise, if the question recommendation system 106 detects the user selecting the option to ignore the suggested question 608, the question recommendation system 106 can remove it. Further, as described above, based on the user's selection to keep or ignore the suggested question, the question recommendation system 106 can provide additional and/or alternative questions to the user.

As mentioned above, the question recommendation system 106 can identify a suggested question based on one or more questions that serve as input. For example, as shown in FIG. 6A, the question recommendation system 106 can generate an input survey graph 620 based on the first question 604 and the second question 606. In particular, the question recommendation system 106 can generate a first node 624 for the first question 604 and a second node 626 for the second question 606, where the nodes are represented by their semantic labels. In addition, the question recommendation system 106 can sequentially link the nodes together to form a pattern, shown as the input survey graph 620.

In addition, as described above with respect to FIG. 5, the question recommendation system 106 can match the pattern of the input survey graph 620 (e.g., the pattern of the semantic labels) to other patterns of nodes within the survey graph database to identify survey graphs from which to obtain a suggested question. For example, the question recommendation system 106 employs vector projections and/or distance similarity comparisons between the semantic labels of the nodes in the semantic space to determine which survey graphs match, are closest, or within a similarity distance threshold of the input survey graph 620. To illustrate, FIG. 6A shows an identified survey graph 622 that includes a matching pattern of nodes as the input survey graph 620 along with an additional node 628. Here, the question recommendation system 106 obtains the suggested question 608 from the additional node 628.

Moreover, the question recommendation system 106 identifies successful patterns that have empirically resulted in completed surveys and high-quality responses. Similarly, the question recommendation system 106 identifies patterns that have been unsuccessful. As a result, the question recommendation system 106 can analyze input survey graphs and recommend suggested questions that align with successful patterns while avoiding suggested questions that lead to unsuccessful patterns. In this manner, the question recommendation system 106 utilizes the pattern of the input survey graph 620 as a Markov Chain to determine which suggested question to provide to the user.

As mentioned above, in various embodiments, the question recommendation system 106 recommends adding a suggested question at a particular position (e.g., order) within a survey being created. To illustrate, FIG. 6B shows the question recommendation system 106 providing a second graphical user interface 632. The second graphical user interface 632 is similar to the first graphical user interface 602 in that the question recommendation system 106 receives the first question 604 and the second question 606. However, in the second graphical user interface 632, the question recommendation system 106 recommends adding the suggested question 608 between the first question 604 and the second question 606.

To elaborate, the question recommendation system 106 identifies the suggested question 608 as described above. Additionally, the question recommendation system 106 determines that the optimal placement of the suggested question 608 is between the first question 604 and the second question 606. For example, in many embodiments, the question recommendation system 106 compares the input survey graph 620 to survey graphs within the survey graph database. Here, the question recommendation system 106 determines that survey graphs having a pattern matching the identified survey graph 630 have higher response rates than those of the input survey graph 620. Accordingly, the question recommendation system 106 recommends adding the suggested question 608 between the first question 604 and the second question 606 to optimize survey responses.

In various embodiments, the question recommendation system 106 provides a suggested question that introduces complex logic into the survey. For instance, the question recommendation system 106 recommends adding skip-logic to the input question or the suggested question. Briefly, skip-logic is the concept that a respondent's answer to a current question influences which question is provided next to the respondent.

Figure 7A:
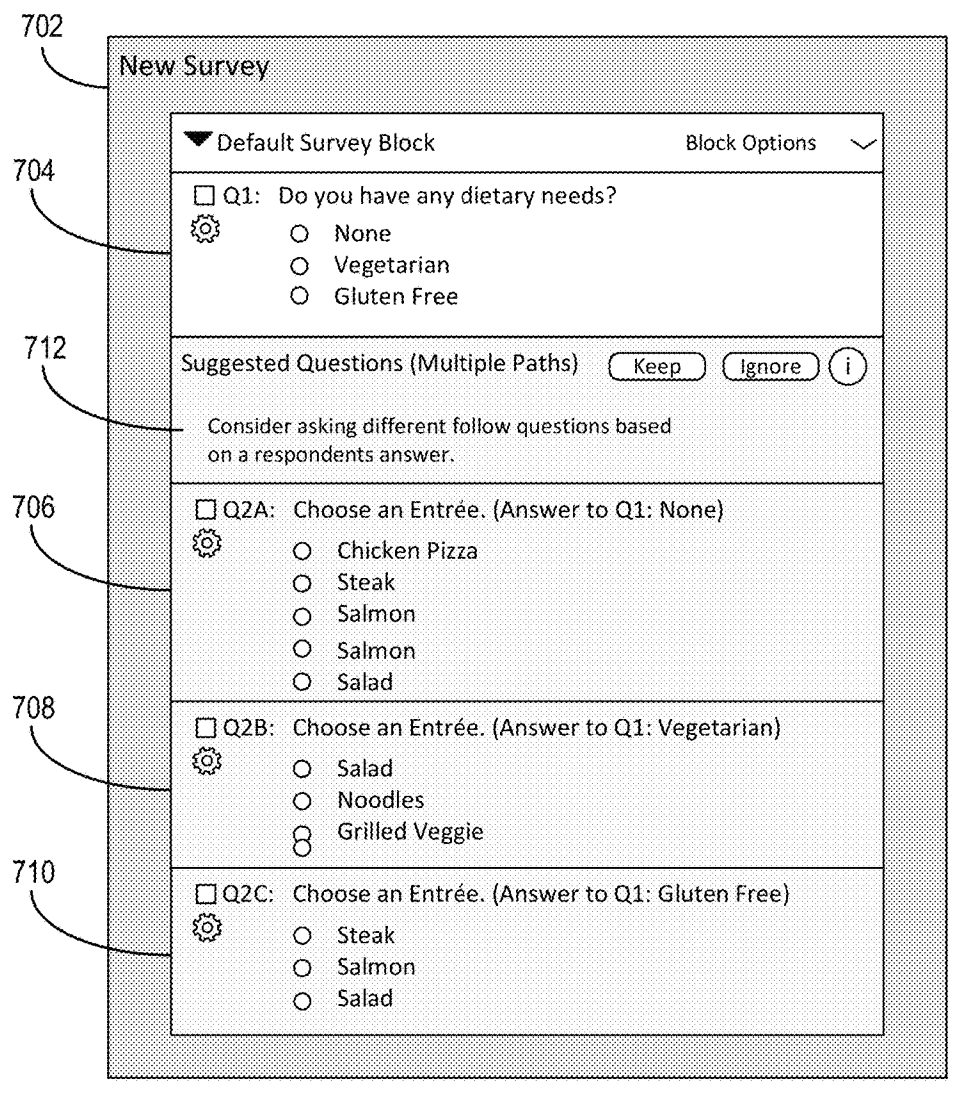

To illustrate, FIG. 7A shows a graphical user interface 702 similar to the graphical user interfaces provided above with respect to FIGS. 6A-6B. Here the user selects the first question 704 (i.e., Q1). Based on receiving the first question 704 as input, the question recommendation system 106 determines that successful surveys follow a pattern that applies skip-logic and branches into different next questions. As shown, the question recommendation system 106 suggests three alternative suggested questions 706-710 (i.e., Q2A, Q2B, Q2C). In particular, the question recommendation system 106 provides the user with three suggested questions that correspond to the different answer choices of the input question.

More specifically, based on the input question, the question recommendation system 106 identifies various survey graphs in the survey graph database as described above. Further, the question recommendation system 106 determines that the patterns that utilize the skip-logic have more favorable response metrics than those without the skip-logic. Accordingly, the question recommendation system 106 recommends the branching or skip-logic suggested questions.

As shown in FIG. 7A, the question recommendation system 106 provides additional information 712 in connection with the multiple suggested questions 706-710. For example, to prevent confusion as to why the question recommendation system 106 is providing multiple suggested questions. In particular, the question recommendation system 106 provides an explanation for the user to consider adding skip-logic to the survey being created to increase the likelihood of respondents providing quality responses and improving the respondent's survey experience.

In some embodiments, the question recommendation system 106 identifies the first question 704 as input without the answer selections. In these embodiments, the question recommendation system 106 may identify potential answer selections. Then, as the user accepts the various answer selections, the question recommendation system 106 can also suggest corresponding suggested question(s) to include in the survey.

Figure 7B:
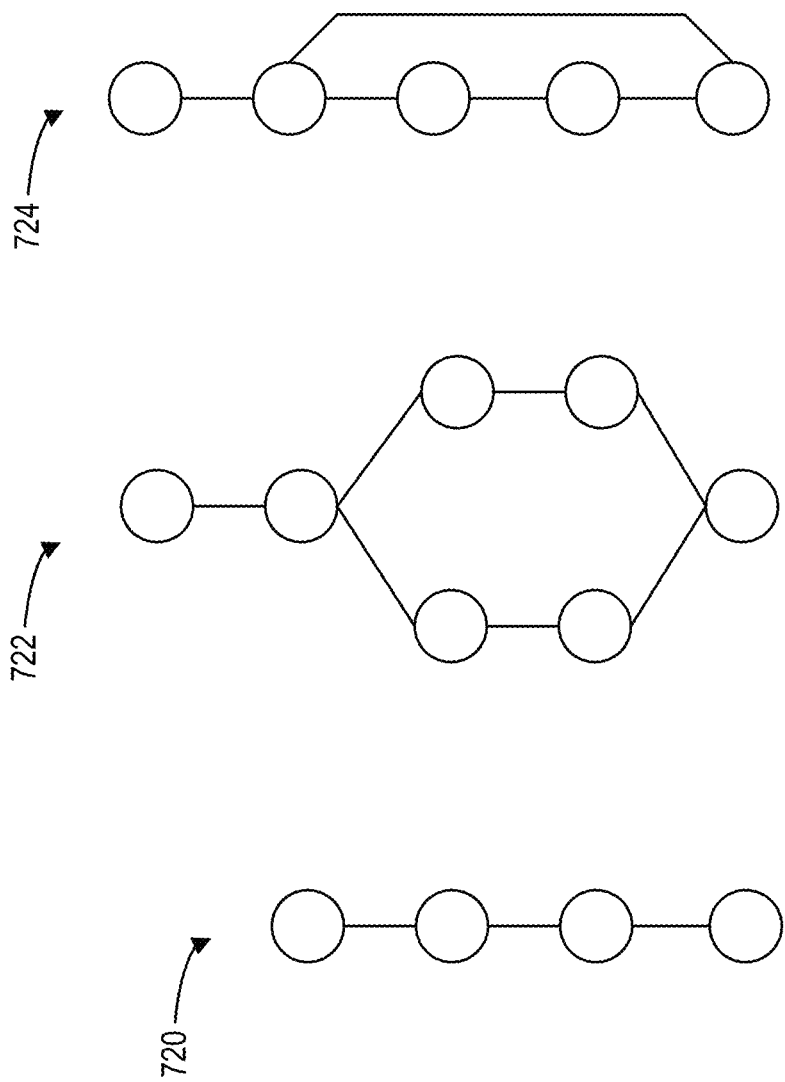

While FIG. 7A shows the question recommendation system 106 providing suggested alternate questions that branch from the first question 704 as input, in some embodiments, the question recommendation system 106 recommends applying skip-logic to previously provided questions. For example, the question recommendation system 106 provides a suggested question that is an alternative question to a previously provided question. Indeed, the suggested question creates a new second node path in the survey graph. Examples of separate node paths are shown below in FIG. 7B.

In various embodiments, the question recommendation system 106 can recommend various levels of skip-logic complexity when providing a suggested question. To illustrate, FIG. 7B shows various survey graph configurations found in the survey graph database, which the question recommendation system 106 can suggest to users creating surveys. As shown, the first survey graph 720 is a linear survey graph that does not include any skip-logic. The second survey graph 722 is a branching survey graph that applies skip-logic at the second node by splitting into two node paths before converging back together at the last node. The third survey graph 724 is another type of branching survey graph that applies skip-logic at the second node by having one path jump to the last node. While not illustrated, survey graphs can form a variety of node paths that split, merger, jump, and loop.

Indeed, as the question recommendation system 106 compares the patterns of input survey graphs to patterns of survey graphs in the survey graph database, the question recommendation system 106 determines whether applying one or more of the skip-logic survey graphs will result in a better survey. For example, in one or more embodiments, the question recommendation system 106 compares the pattern of an input survey graph to each node path of the survey graphs in the survey graph database to identify matching patterns. If the question recommendation system 106 identifies a matching pattern from a node path within a survey graph having skip-logic, the question recommendation system 106 can determine whether to recommend applying similar suggested questions and/or skip-logic to the survey being created by the user.

Figure 8:
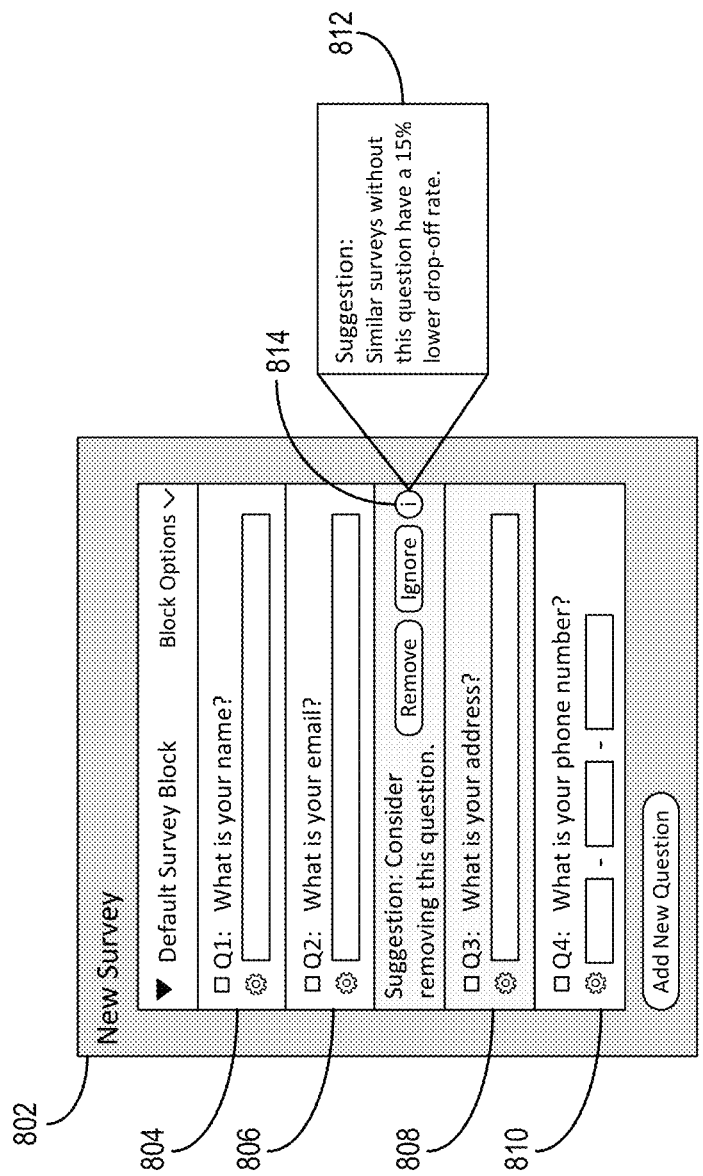
FIG. 8 illustrates an example graphical user interface for suggesting removal of a question in accordance with one or more embodiments.

Turning now to the next figure, FIG. 8 illustrates a graphical user interface 802 for suggesting removal of a question in accordance with one or more embodiments. As shown, the graphical user interface 802 includes a first question 804, a second question 806, a third question 808, and a fourth question 810. As also shown, the question recommendation system 106 recommends removing the third question 808 as well as provides additional information 812 as to why the third question 808 is being recommended for elimination.

As mentioned above, the question recommendation system 106 compares patterns of input survey graphs to the survey graph database to determine when to recommend a suggested question. As the same time, the question recommendation system 106 can determine whether one or more questions in the input survey graph is unnecessary or otherwise hindering the optimization of the survey being created.

To illustrate, if the question recommendation system 106 determines that one of the questions in the input survey graph has response metrics that do not satisfy a passable response metric threshold, such as minimum or maximum response metric threshold (e.g., the response rate is below a minimum response rate threshold, the skip rate is above a maximum skip rate threshold, or the drop-off rate is above a maximum drop-off rate threshold), when compared to survey graphs with similar patterns, the question recommendation system 106 recommends eliminating the question. In alternative embodiments, if a single input question has response metrics that do not satisfy the passable response metric threshold, the question recommendation system 106 can recommend eliminating the question.

As mentioned above, the question recommendation system 106 provides a suggestion to remove the third question 808. In various embodiments, upon the user selecting an additional information element 814 (i.e., the "i" button), the question recommendation system 106 provides additional information 812 to the user supporting the suggestion. As shown, the question recommendation system 106 suggest removing the third question 808 as it increases the drop-off rate (e.g., respondents quitting the survey) among respondents. In some embodiments, the question recommendation system 106 recommends relocating a given question within the survey in a way that mitigates the negative effects of the question (e.g., "moving this question up to the front or near the end lowers the drop-off rate to 5% compared to similar surveys"). In alternative embodiments, the question recommendation system 106 indicates that rearranging the order of the given question has no adverse effect on the question or responses.

Figure 9A:
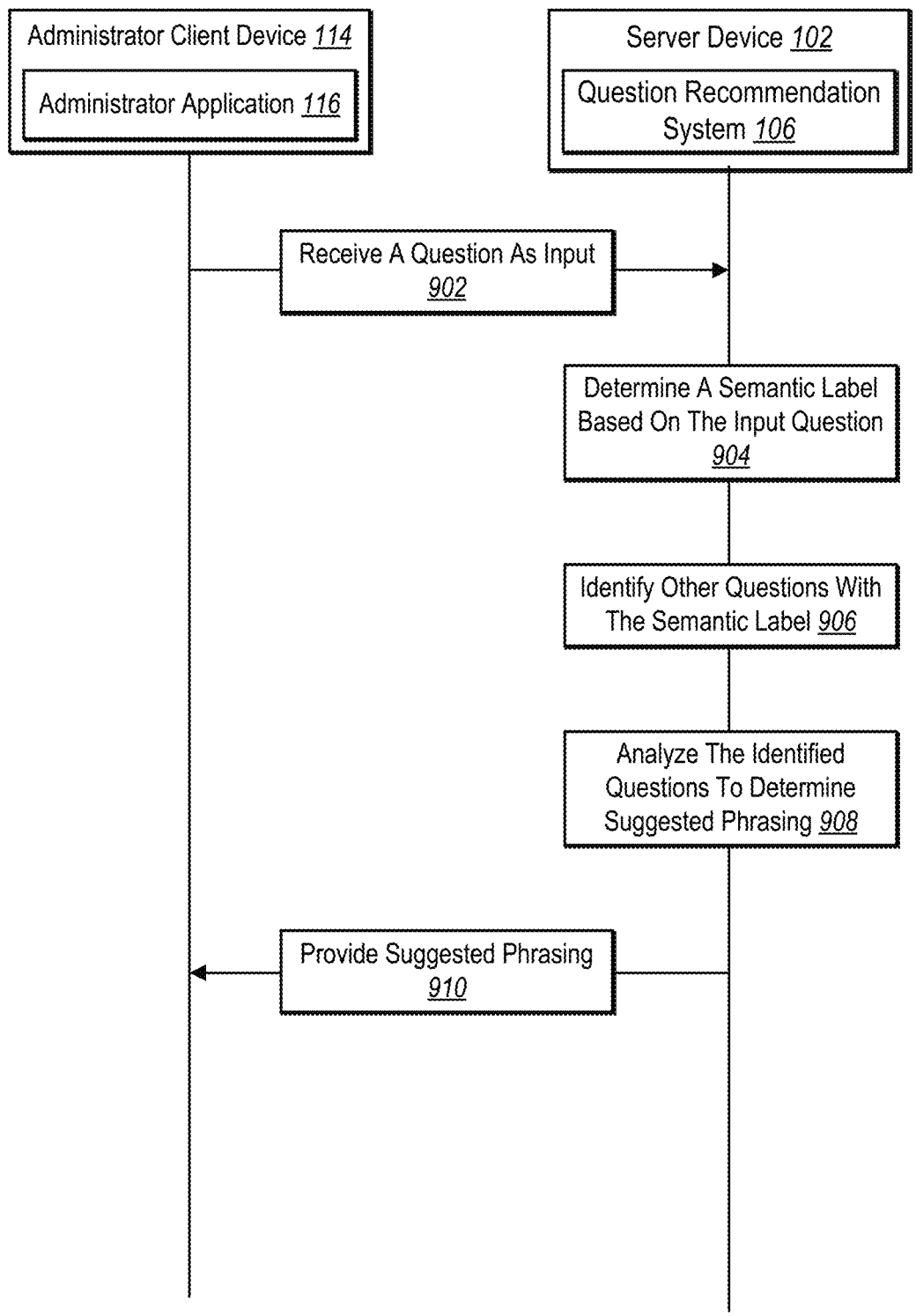

FIGS. 9A-9B illustrate recommending alternative question phrasing for a question in accordance with one or more embodiments. FIG. 9A includes the administrator client device 114 having the administrator application 116 as well as the server device 102 having the question recommendation system 106, which are described above. As shown, the question recommendation system 106 receives 902 a question as input, as described above. The question recommendation system 106 also determines 904 a semantic label based on the input question, as previously described.

In addition, the question recommendation system 106 identifies 906 other questions with the semantic label. For example, as explained earlier, the question recommendation system 106 matches the semantic label of the input questions to other nodes within the survey graph database that share the same or similar semantic label. For instance, the question recommendation system 106 generates a table of nodes that have the same semantic label as the input question.

As shown, the question recommendation system 106 analyzes 908 the identified questions to determine suggested phrasing. For example, in one or more embodiments, the question recommendation system 106 determines which node from the nodes having the same semantic label has the most one or more favorable response metrics, as described above. Then, the question recommendation system 106 extracts the text from the determined node.

As mentioned above, the question recommendation system 106 can create a table of nodes that have the same semantic label as the input question. For example, as part of the table, the question recommendation system 106 extracts the question text from each node and groups together nodes that share the same wording. In addition, the question recommendation system 106 can combine the response metrics of the grouped nodes to calculate aggregate response metrics. Further, utilizing the aggregate response metrics, the question recommendation system 106 selects the question wording having the most favorable one or more response metrics, as described above.

Upon determining alternative wording, the question recommendation system 106 provides 910 the suggested phrasing to the user via the administrator client device 114. For example, FIG. 9B shows a graphical user interface 912 of the question recommendation system 106 providing a question rephrasing suggestion 916 to rephrase the third question 914 provided by the user. As shown, the question rephrasing suggestion 916 provides a recommendation to the user to change the questions wording as well as an explanation for the recommendation.

In alternative embodiments, the question recommendation system 106 utilizes a question phrasing database (e.g., question phrasing database 112) to determine question rephrasing. As mentioned above, the question phrasing database can include multiple versions of a survey question along with response metric s indicating the version's effectiveness. In additional, the question phrasing database is organized by semantic labels, where each semantic label is associated with one or more versions (e.g., wording variations) of a question based on previously administered surveys along with corresponding response metrics.

Utilizing the question phrasing database, the question recommendation system 106 identifies the questions within the database along with question variations. In addition, the question recommendation system 106 determines if one of the wording variations is likely to trigger more favorable responses (e.g., based on response metrics). In some instances, the question recommendation system 106 determines that the question wording of the input question is currently the most favorable question wording.

In additional embodiments, the question recommendation system 106 further organizes the entries in the question phrasing database based on audience characteristics. In this manner, the user can provide particular attributes of a target audience, such as age, demographics, location, etc., and the question recommendation system 106 can identify which wording variation of a question best suits the target audience (e.g., has the most favorable response metrics when filtered by the target audience characteristics).

In some embodiments, the question recommendation system 106 weights the question variations by question type and/or question category. For example, if the one of the question wording variations in the question phrasing database shares the same question category (e.g., online retail, fast food, copyright services, etc.) as the input question, the question recommendation system 106 provides greater weight to the response metrics than other question wording variations to the input question. In this manner, although a first question wording is better suited for general category questions, respondents for a specific category will respond better to a second question wording.

In various embodiments, along with providing a question wording suggestion, the question recommendation system 106 can also recommend a user change the question type. For example, the question recommendation system 106 identifies that the user has selected an opened-ended text response. Upon comparing the input question to other nodes in the survey graph database based on semantic labels, the question recommendation system 106 determines that a more structured text-response (e.g., 10-digits only for a phone number) results in higher quality responses to the question. Similarly, the question recommendation system 106 identifies and recommends a different questions type, such as multi-choice selection, as an alternative question type.

Similarly, in one or more embodiments, the question recommendation system 106 can provide recommended answer selections to an input question. For example, upon detecting a user adding a question, the question recommendation system 106 can identify and provide the most common answers as suggested answer selections for a user to add to their question. Further, the question recommendation system 106 can suggest and/or auto-complete answer selections as the user beings inputting (e.g., typing) in potential answer selections.

Figure 10:
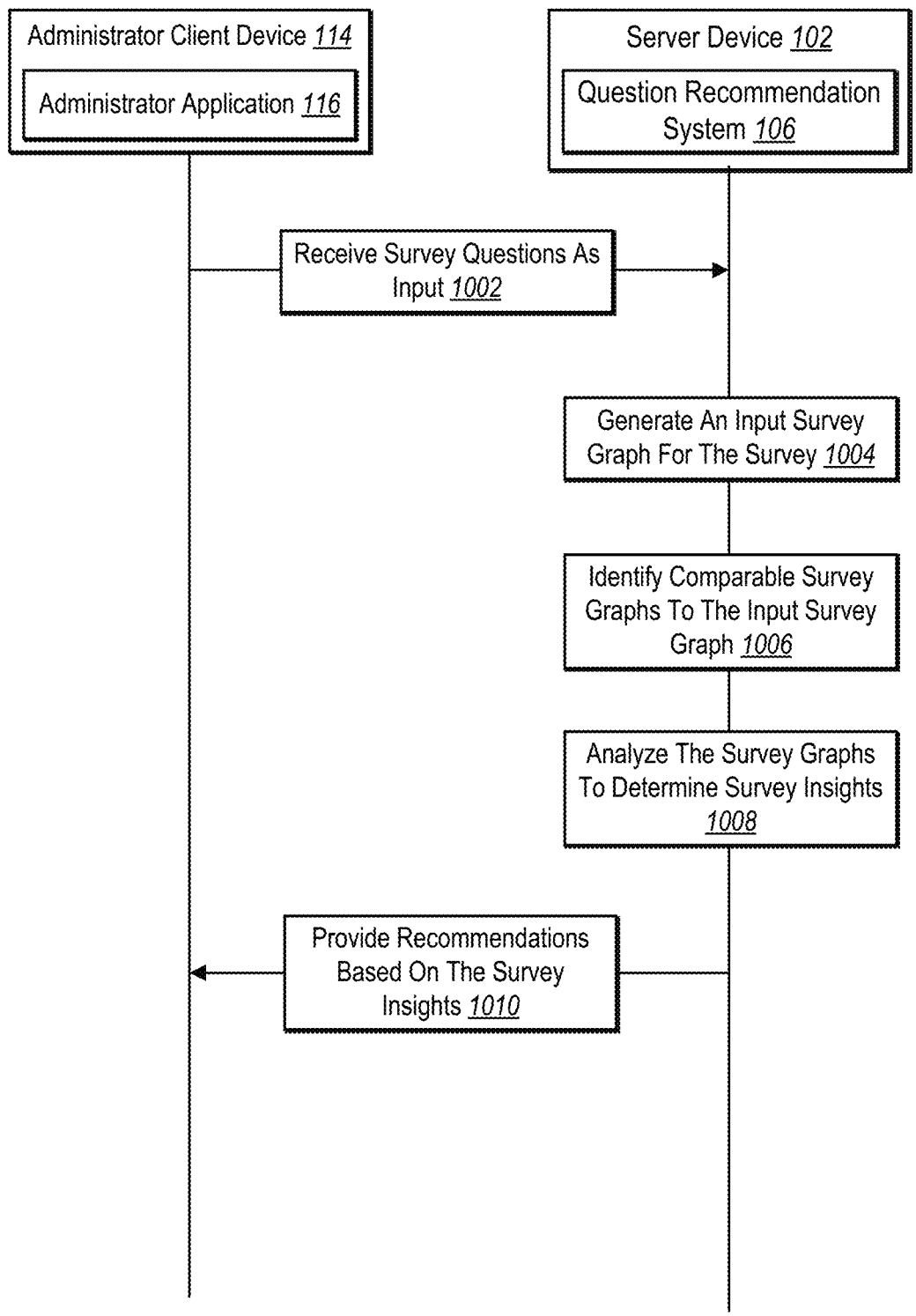
FIG. 10 illustrates an example sequence diagram of providing survey recommendations for a survey in accordance with one or more embodiments.

Turning now to FIG. 10, additional detail is now provided regarding the question recommendation system 106 providing additional recommendations to a user creating a survey based on input questions. In particular, FIG. 10 illustrates a sequence diagram of providing survey recommendations for a survey in accordance with one or more embodiments. As illustrated, FIG. 10 includes the administrator client device 114 having the administrator app 116 as well as the server device 102 having the question recommendation system 106, which are described above.

As shown, the question recommendation system 106 receives 1002 a question as input, as described above. The question recommendation system 106 also generates 1004 an input survey graph for the survey, as previously described. Additionally, the question recommendation system 106 identifies 1006 comparable survey graphs to the input survey graph, as explained earlier. Further, the question recommendation system 106 analyzes 1008 the identified survey graphs to determine survey insights.

Survey insights can include a variety of recommendations that improve and optimize the survey being created by the user. To illustrate, an example of a survey insight includes a survey quality score that compares the survey being built to previously administered surveys. For example, the question recommendation system 106 utilizes vector projections to compare the input survey graph to the identified survey graphs to determine a similarly score between each match. Then, the question recommendation system 106 applies a similarity score with an identified survey graph to one or more corresponding response metrics from the identified survey graph to determine a survey quality scores. Further, the question recommendation system 106 can average all of the survey quality scores to determine an overall survey quality score for the survey being built, where the survey quality score indicates how likely respondents are to provide quality feedback to the survey as a whole and/or particular questions.

In addition, the survey insights can indicate if the user is building their survey following proven patterns of success (e.g., favorable response metrics) or if their survey follows a pattern that has resulted in unfavorable response metrics. Similarly, survey insights can indicate whether the survey created by the user is distinct from previously created surveys, which can signal a potentially risky survey strategy.

Survey insights can also provide recommendations to improve response metrics, such as where to re-order questions, when to end a survey, which questions to eliminate (described above), when to apply skip-logic (described above), and/or which questions trigger personal information flags or language translation flags. In one or more embodiments, the question recommendation system 106 compares the input survey graph to the survey graphs in the survey graph database to determine whether re-ordering one or more nodes in the input survey graph results in more favorable response metrics, as explained previously.

In some embodiments, the question recommendation system 106 determines that similar survey graphs in the survey graph database having fewer nodes than the input survey graph have more favorable response metrics than similar survey graphs in the survey graph database having the same number of nodes as the input survey graph. As such, the question recommendation system 106 determines to recommend removing one or more questions from the survey. In some embodiments, the question recommendation system 106 suggests specific questions to remove.

Similarly, based on comparing the input survey graph to other survey graphs as the user adds questions to their survey, the question recommendation system 106 determines that adding additional questions would have a detrimental outcome. Indeed, the question recommendation system 106 can determine to recommend ending a survey after a certain number of questions. In some instances, the question recommendation system 106 determines to provide a warning to the user that adding additional questions of a particular question type or category will increase the drop-off rate and/or lower the quality of responses.

In various embodiments, the question recommendation system 106 determines that one or more questions trigger personal identifiable information (PII), which may be an unintended by the user creating the survey. For example, the question recommendation system 106 detects instances of PII in a potential question and notifies (e.g., warns) the user and/or blocks the user from requesting personal or identifying information from respondents. In other embodiments, the question recommendation system 106 determines that some questions trigger language translation flags such that the questions will be poorly machine-translated across languages. As such, the question recommendation system 106 determines to recommend warning the user about potential risks and negative effects.

As shown in FIG. 10, the question recommendation system 106 can provide 1010 recommendations to the user on the administrator client device 114 based on the survey insights. For example, the question recommendation system 106 provides the recommendations in line in the survey being created by the user within the administrator application 116 on the administrator client device 114. In alternative embodiments, the question recommendation system 106 provides the recommendations based on the survey insights as a pop-up or another type of notification.

Figure 11:
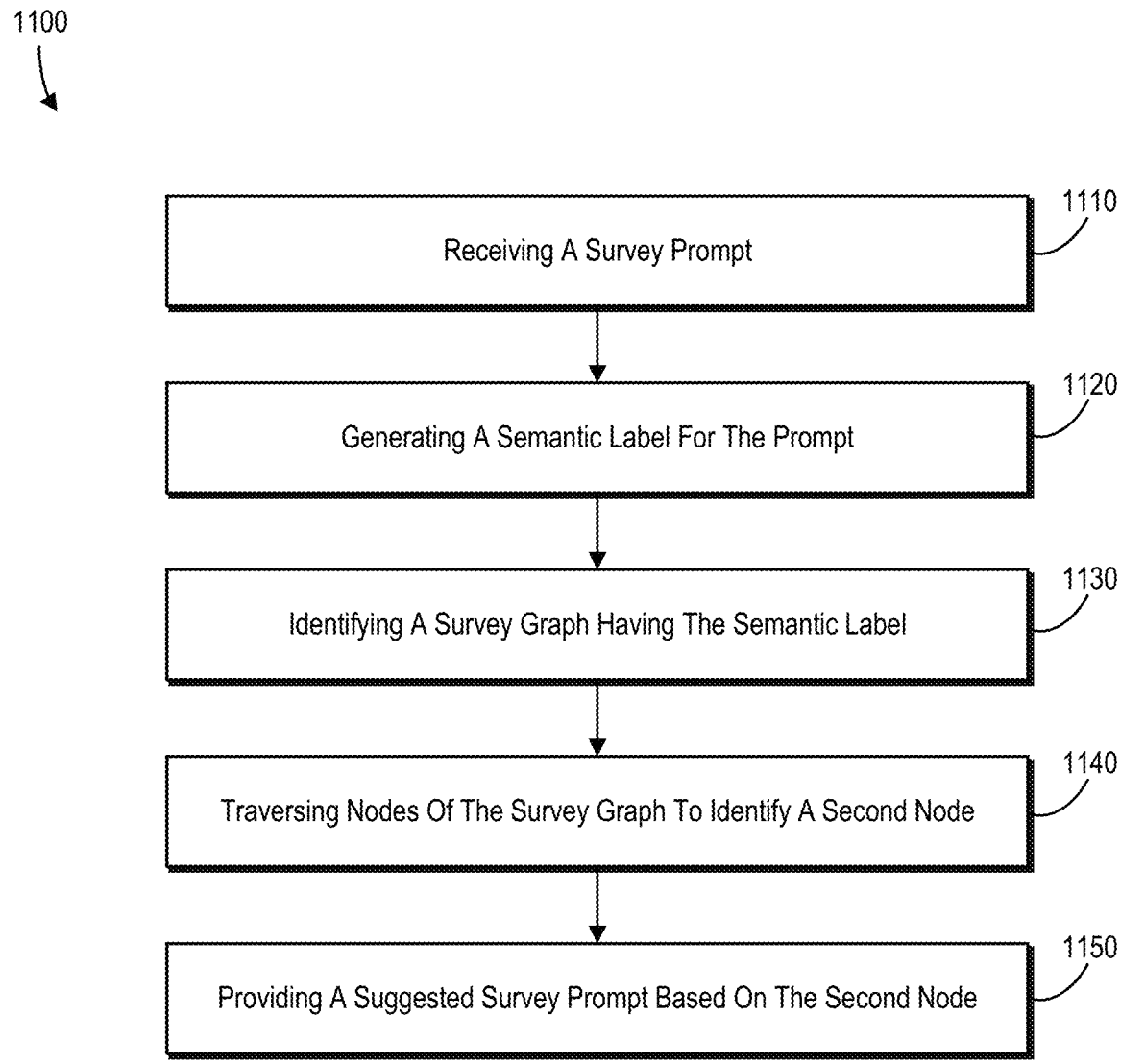
FIG. 11 illustrates a flowchart of a series of acts for providing a suggested survey prompt in accordance with one or more embodiments.

FIGS. 1-10, the corresponding text, and the examples provide a number of different methods, systems, devices, and non-transitory computer-readable media of the question recommendation system 106 in accordance with one or more embodiments. In addition to the above description, one or more embodiments can also be described in terms of flowcharts including acts for accomplishing a particular result. For example, FIG. 11 illustrates flowcharts of an exemplary sequence of acts for providing a suggested survey prompt in accordance with one or more embodiments. FIG. 11 may be performed with more or fewer acts. Further, the acts may be performed in differing orders. Additionally, the acts described herein may be repeated or performed in parallel with one another or parallel with different instances of the same or similar acts.

While FIG. 11 illustrates series of acts according to particular embodiments, alternative embodiments may omit, add to, reorder, and/or modify any of the acts shown in FIG. 11. The series of acts of FIG. 11 can be performed as part of a method. Alternatively, a non-transitory computer-readable medium can comprise instructions, that when executed by one or more processors, cause a computing device to perform the series of acts of FIG. 11. In still further embodiments, a system can perform the acts of FIG. 11. In addition, in one or more embodiments, the series of acts 1100 is implemented on one or more computing devices, such as a server device 102 and/or administrator client device 114.

The series of acts 1100 includes an act 1110 of receiving a survey prompt. In particular, the act 1110 can involve receiving, from a client device, a survey prompt (e.g., survey question) provided by a user associated with the client device. In one or more embodiments, the act 1110 includes detecting that a user (e.g., an administrator) at an administrator client device has selected one or more survey prompts as part of creating a survey to provide to respondents.

As shown, the series of acts 1100 also includes an act 1120 of generating a semantic label for the prompt. In particular, the act 1120 can involve generating a first semantic label for the survey prompt. In one or more embodiments, the act 1120 includes converting the survey prompt into an n-dimensional vector in semantic space, determining a location within the semantic space based on the n-dimensional vector, and identifying the first semantic label for the survey prompt based on the location within the semantic space being associated with the first semantic label.

As shown in FIG. 11, the series of acts 1100 further includes an act 1130 of identifying a survey graph having the semantic label. In particular, the act 1130 can involve identifying, from a database of survey graphs where each survey graph includes a plurality of sequential nodes each having semantic labels, a first survey graph including a first node having the first semantic label. In some embodiments, the act 1130 includes identifying survey graphs in a survey graph database that have the first semantic label or a similar semantic label. In one or more embodiments, identifying the same or similar survey graphs is based on vector projections and cosine similarity comparisons of the semantic labels in the semantic space.

As shown, the series of acts 1100 also includes an act 1140 of traversing nodes of the survey graph to identify a second node. In some embodiments, the act 1140 includes identifying the second node being adjacent to the first node of the first survey graph. In alternative embodiments, the act 1140 includes identifying the second node being located before the first node in the first survey graph. In one or more embodiments, the act 1140 includes determining that the second node satisfies one or more survey prompt response metrics. In various embodiments, the act 1140 includes the second node have a second semantic label that is similar to the first semantic label.

In addition, the series of acts 1100 includes an act 1150 of providing a suggested survey prompt based on the second node. In particular, the act 1150 can involve providing, to the client device, a suggested survey prompt based on the second node of the first survey graph. In one or more embodiments, the act 1150 includes identifying a survey prompt type and survey prompt wording from the second node and providing the survey prompt type and the survey prompt wording identified from the second node as the suggested survey prompt. In various embodiments, a survey prompt associated with the first node of the first survey graph is different from the survey prompt received from the client device (e.g., the same semantic label but different question wording).

The series of acts 1100 can also include a number of additional acts. For example, in one or more embodiments, a first survey prompt response metric includes a response rate. In additional embodiments, survey prompt response metrics include a drop-off rate, a skip rate, and dwell time.

In some embodiments, the series of acts includes the acts of receiving a plurality of surveys each having a plurality of prompts; for each survey prompt from each survey of the plurality of surveys, determining a semantic label and creating a node that includes the survey prompt, the semantic label, a survey prompt order within the survey, and one or more survey prompt response metrics; and generating, for each survey of the plurality of surveys, a survey graph that sequences the nodes in the survey according to the survey prompt order of each survey prompt in the survey.

In various embodiments, the series of acts includes the acts of identifying, from the database of survey graphs, a second survey graph including a third node having the first semantic label; determining that the first node in the first survey graph has a more favorable survey prompt response rate metric than a third node in the second survey graph; and selecting, based on the determination, to traverse the first survey graph to identify the second node.

In one or more embodiments, the act 1130 includes identifying that the first node separates into two branches within the first survey graph, the act 1140 includes identifying the second node from a first branch and identifying a third node from a second branch as an alternative to the second node, and the act 1150 further includes providing an alternative suggested survey prompt based on the third node in connection with providing the suggested survey prompt.

In some embodiments, the series of acts includes the acts of receiving, from a client device, a plurality of survey prompts as input; generating an input survey graph from the plurality of survey prompts; comparing the input survey graph to survey graphs in a survey graph database to determine a survey prompt from the plurality of survey prompts to eliminate; and providing, to the client device, a recommendation to remove the determined survey prompt from the plurality of survey prompts.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., memory), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices), or vice versa. For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some embodiments, computer-executable instructions are executed by a general-purpose computer to turn the general-purpose computer into a special purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. As used herein, the term "cloud computing" refers to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In addition, as used herein, the term "cloud-computing environment" refers to an environment in which cloud computing is employed.

Figure 12:
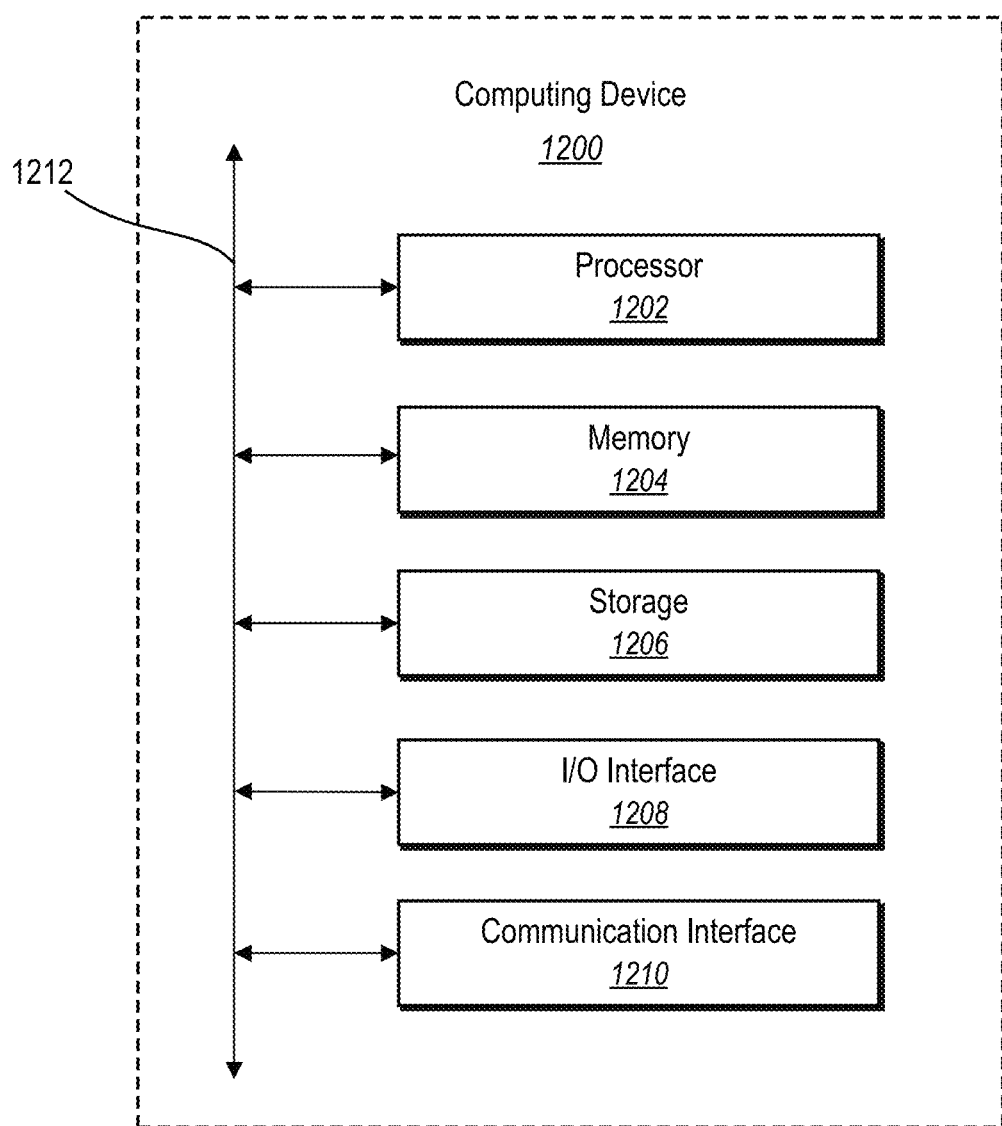
FIG. 12 illustrates a block diagram of an exemplary computing device for implementing one or more embodiments of the present disclosure.

FIG. 12 illustrates a block diagram of a computing device 1200 that may be configured to perform one or more of the processes described above associated with the question recommendation system 106. One will appreciate that one or more computing devices, such as the computing device 1200 may represent the computing devices described above (e.g., server devices 102 and client devices 114, 118). In one or more embodiments, the computing device 1200 may be a non-mobile device (e.g., a desktop computer or another type of client device). In some embodiments, the computing device 1200 may be a mobile device (e.g., a mobile telephone, a smartphone, a PDA, a tablet, a laptop, a camera, a tracker, a watch, a wearable device, etc.). Further, the computing device 1200 may be a server device that includes cloud-based processing and storage capabilities.

As shown in FIG. 12, the computing device 1200 can include one or more processor(s) 1202, memory 1204, a storage device 1206, input/output interfaces 1208 (or simply "I/O interfaces 1208"), and a communication interface 1210, which may be communicatively coupled by way of a communication infrastructure (e.g., bus 1212). While the computing device 1200 is shown in FIG. 12, the components illustrated in FIG. 12 are not intended to be limiting. Additional or alternative components may be used in other embodiments. Furthermore, in certain embodiments, the computing device 1200 includes fewer components than those shown in FIG. 12. Components of the computing device 1200 shown in FIG. 12 will now be described in additional detail.

In particular embodiments, the processor(s) 1202 includes hardware for executing instructions, such as those making up a computer program. As an example, and not by way of limitation, to execute instructions, the processor(s) 1202 may retrieve (or fetch) the instructions from an internal register, an internal cache, memory 1204, or a storage device 1206 and decode and execute them.

The computing device 1200 includes memory 1204, which is coupled to the processor(s) 1202. The memory 1204 may be used for storing data, metadata, and programs for execution by the processor(s). The memory 1204 may include one or more of volatile and non-volatile memories, such as Random-Access Memory ("RAM"), Read-Only Memory ("ROM"), a solid-state disk ("SSD"), Flash, Phase Change Memory ("PCM"), or other types of data storage. The memory 1204 may be internal or distributed memory.

The computing device 1200 includes a storage device 1206 includes storage for storing data or instructions. As an example, and not by way of limitation, the storage device 1206 can include a non-transitory storage medium described above. The storage device 1206 may include a hard disk drive (HDD), flash memory, a Universal Serial Bus (USB) drive or a combination these or other storage devices.

As shown, the computing device 1200 includes one or more I/O interfaces 1208, which are provided to allow a user to provide input to (such as user strokes), receive output from, and otherwise transfer data to and from the computing device 1200. These I/O interfaces 1208 may include a mouse, keypad or a keyboard, a touch screen, camera, optical scanner, network interface, modem, other known I/O devices or a combination of such I/O interfaces 1208. The touch screen may be activated with a stylus or a finger.

The I/O interfaces 1208 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O interfaces 1208 are configured to provide graphical data to a display for presentation to a user. The graphical data may be representative of one or more graphical user interfaces and/or any other graphical content as may serve a particular implementation.

The computing device 1200 can further include a communication interface 1210. The communication interface 1210 can include hardware, software, or both. The communication interface 1210 provides one or more interfaces for communication (such as, for example, packet-based communication) between the computing device and one or more other computing devices or one or more networks. As an example, and not by way of limitation, communication interface 1210 may include a network interface controller (NIC) or network adapter for communicating with an Ethernet or other wire-based network or a wireless NIC (WNIC) or wireless adapter for communicating with a wireless network, such as a WI-FI. The computing device 1200 can further include a bus 1212. The bus 1212 can include hardware, software, or both that connects components of computing device 1200 to each other.

Figure 13:
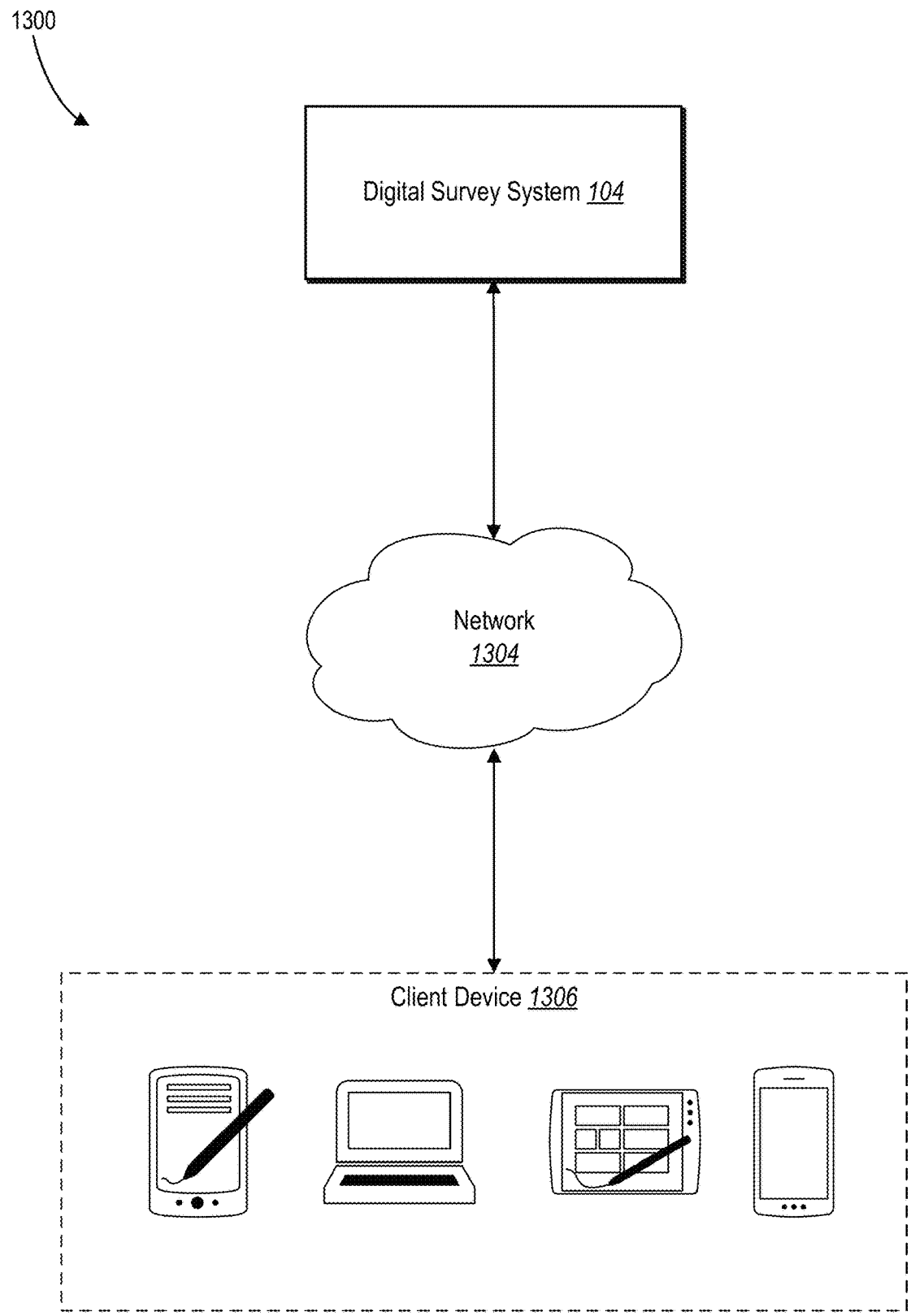
FIG. 13 illustrates an example network environment of a digital survey system in accordance with one or more embodiments described herein.

FIG. 13 illustrates a network environment 1300 of a digital survey system 104, such as embodiments of the question recommendation system 106 within the digital survey system 104, as described herein. The network environment 1300 includes the digital survey system 104 and a client device 1306 connected to each other by a network 1304. Although FIG. 13 illustrates a particular arrangement of the digital survey system 104, the client device 1306, and the network 1304, one will appreciate that other arrangements of the network environment 1300 are possible. For example, a client device of the client device 1306 is directly connected to the digital survey system 104. Moreover, this disclosure contemplates any suitable number of client systems, digital survey systems, and networks are possible. For instance, the network environment 1300 includes multiple client systems.

This disclosure contemplates any suitable network. As an example, one or more portions of the network 1304 may include an ad hoc network, an intranet, an extranet, a VPN, a LAN, a wireless LAN, a WAN, a wireless WAN, a MAN, a portion of the Internet, a portion of the Public Switched Telephone Network (PSTN), a cellular telephone network, a safelight network, or a combination of two or more of these. The term "network" may include one or more networks and may employ a variety of physical and virtual links to connect multiple networks together.

In particular embodiments, the client device 1306 is an electronic device including hardware, software, or embedded logic components or a combination of two or more such components and capable of carrying out the appropriate functionalities implemented or supported by the client system. As an example, the client device 1306 includes any of the computing devices discussed above. The client device 1306 may enable a user at the client device 1306 to access the network 1304. Further, the client device 1306 may enable a user to communicate with other users at other client systems.

In some embodiments, the client device 1306 may include a web browser, such as and may have one or more add-ons, plug-ins, or other extensions. The client device 1306 may render a web page based on the HTML files from the server for presentation to the user. For example, the client device 1306 renders the graphical user interface described above.

In one or more embodiments, the digital survey system 104 includes a variety of servers, sub-systems, programs, modules, logs, and data stores. In some embodiments, digital survey system 104 includes one or more of the following: a web server, action logger, API-request server, relevance-and-ranking engine, content-object classifier, notification controller, action log, third-party-content-object-exposure log, inference module, authorization/privacy server, search module, user-targeting module, user-interface module, user-profile store, connection store, third-party content store, or location store. The digital survey system 104 may also include suitable components such as network interfaces, security mechanisms, load balancers, failover servers, management-and-network-operations consoles, other suitable components, or any suitable combination thereof.

In the foregoing specification, the invention has been described with reference to specific exemplary embodiments thereof. Various embodiments and aspects of the invention(s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with fewer or more steps/acts or the steps/acts may be performed in differing orders. Additionally, the steps/acts described herein may be repeated or performed in parallel to one another or in parallel to different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A computer-implemented method comprising:
receiving, from an administrator client device, a user-generated survey prompt;
generating an encoded survey prompt comprising a semantic label;
accessing a database of survey graphs, wherein each survey graph within the database of survey graphs represents a previously created and administered digital survey;
based on the semantic label of the encoded survey prompt, identifying from the database of survey graphs:
a first survey graph comprising a first node with a first semantic label corresponding to the semantic label of the encoded survey prompt; and
a second survey graph comprising a second node with a second semantic label corresponding to the semantic label of the encoded survey prompt;
comparing first response data associated with the first node with second response data associated with the second node;
determining, based on comparing the first response data to the second response data, to traverse the first survey graph to identify a suggested survey prompt corresponding to an additional node within the first survey graph;
providing, to the administrator client device, an option to use the suggested survey prompt; and
based on receiving an indication of an interaction with the option to use the suggested survey prompt, generating a digital survey comprising the user-generated survey prompt and the suggested survey prompt.

2. The computer-implemented method of claim 1, wherein comparing the first response data with the second response data comprises determining that the first node in the first survey graph has a more favorable survey prompt response rate metric than the second node in the second survey graph.

3. The computer-implemented method of claim 1, further comprising providing the suggested survey prompt for display on the administrator client device.

4. The computer-implemented method of claim 1, further comprising:
identifying a survey prompt type and a survey prompt wording from the additional node; and
wherein providing the suggested survey prompt for display on the administrator client device comprises providing, as the suggested survey prompt, the survey prompt type and the survey prompt wording identified from the additional node.

5. The computer-implemented method of claim 4, further comprising providing a keep selectable option and an ignore selectable option in combination with providing the suggested survey prompt.

6. The computer-implemented method of claim 5, further comprising associating the suggested survey prompt with the user-generated survey prompt to generate an electronic survey based on receiving, from the administrator client device, an indication of a selection of the keep selectable option.

7. The computer-implemented method of claim 5, further comprising providing an additional suggested survey prompt for display on the administrator client device based on receiving, from the administrator client device, an indication of a selection of the ignore selectable option.

8. A non-transitory computer-readable medium storing instructions that, when executed by at least one processor, cause a computer device to:
receive, from an administrator client device, a user-generated survey prompt;
generate an encoded survey prompt comprising a semantic label;
access a database of survey graphs, wherein each survey graph within the database of survey graphs represents a previously created and administered digital survey;
based on the semantic label of the encoded survey prompt, identify from the database of survey graphs:
a first survey graph comprising a first node with a first semantic label corresponding to the semantic label of the encoded survey prompt; and
a second survey graph comprising a second node with a second semantic label corresponding to the semantic label of the encoded survey prompt;
compare first response data associated with the first node with second response data associated with the second node;
determine, based on comparing the first response data to the second response data, to traverse the first survey graph to identify a suggested survey prompt corresponding to an additional node within the first survey graph;
based on receiving an indication of an interaction with an option to use the suggested survey prompt, generating a digital survey comprising the user-generated survey prompt and the suggested survey prompt; and
provide, to a respondent client device, the digital survey comprising the user-generated survey prompt and the suggested survey prompt.

9. The non-transitory computer-readable medium of claim 8, wherein comparing the first response data with the second response data comprises determining that the first node in the first survey graph has a more favorable survey prompt response rate metric than the second node in the second survey graph.

10. The non-transitory computer-readable medium of claim 8, further comprising instructions that cause the computer device to provide the suggested survey prompt for display on the administrator client device.

11. The non-transitory computer-readable medium of claim 10, further comprising instructions that cause the computer device to:
identify a survey prompt type and a survey prompt wording from the additional node; and
wherein providing the suggested survey prompt for display on the administrator client device comprises providing, as the suggested survey prompt, the survey prompt type and the survey prompt wording identified from the additional node.

12. The non-transitory computer-readable medium of claim 10, further comprising instructions that cause the computer device to provide a keep selectable option and an ignore selectable option in combination with providing the suggested survey prompt.

13. The non-transitory computer-readable medium of claim 12, further comprising instructions that cause the computer device to associate the suggested survey prompt with the user-generated survey prompt to generate an electronic survey based on receiving, from the administrator client device, an indication of a selection of the keep selectable option.

14. The non-transitory computer-readable medium of claim 12, further comprising instructions that cause the computer device to provide an additional suggested survey prompt for display on the administrator client device based on receiving, from the administrator client device, an indication of a selection of the ignore selectable option.

15. A system, comprising:
at least one processor; and
a non-transitory computer-readable storage medium comprising instructions that, when executed by the at least one processor, cause the system to:
receive, from an administrator client device, a user-generated survey prompt;
generate an encoded survey prompt comprising a semantic label;
access a database of survey graphs, wherein each survey graph within the database of survey graphs represents a previously created and administered digital survey:
based on the semantic label of the encoded survey prompt, identify from the database of survey graphs:
a first survey graph comprising a first node with a first semantic label corresponding to the semantic label of the encoded survey prompt; and
a second survey graph comprising a second node with a second semantic label corresponding to the semantic label of the encoded survey prompt;
compare first response data associated with the first node with second response data associated with the second node;
determine, based on comparing the first response data to the second response data, to traverse the first survey graph to identify a suggested survey prompt corresponding to an additional node within the first survey graph;
provide to the administrator client device, an option to use the suggested survey prompt;
based on receiving an indication of an interaction with the option to use the suggested survey prompt, generate a digital survey comprising the user-generated survey prompt and the suggested survey prompt; and provide, to a respondent client device, the digital survey comprising the user-generated survey prompt and the suggested survey prompt.

16. The system of claim 15, wherein comparing the first response data with the second response data comprises determining that the first node in the first survey graph has a more favorable survey prompt response rate metric than the second node in the second survey graph.

17. The system of claim 16, wherein the survey prompt response rate metric comprises at least one of a drop-off rate, a skip rate, or a dwell time.

18. The system of claim 15, further comprising instructions that cause the system to provide the suggested survey prompt for display on the administrator client device.

19. The system of claim 18, further comprising instructions that cause the system to:
- identify a survey prompt type and a survey prompt wording from the additional node; and
- wherein providing the suggested survey prompt for display on the administrator client device comprises providing, as the suggested survey prompt, the survey prompt type and the survey prompt wording identified from the additional node.

20. The system of claim 18, further comprising instructions that cause the system to provide a keep selectable option and an ignore selectable option in combination with providing the suggested survey prompt.

* * * * *